(12) United States Patent
Van Rozendaal et al.

(10) Patent No.: US 12,501,050 B2
(45) Date of Patent: Dec. 16, 2025

(54) EFFICIENT WARPING-BASED NEURAL VIDEO CODEC

(71) Applicant: QUALCOMM Incorporated, San Diego, CA (US)

(72) Inventors: Ties Jehan Van Rozendaal, Amsterdam (NL); Hoang Cong Minh Le, Santee, CA (US); Tushar Singhal, San Diego, CA (US); Amir Said, San Diego, CA (US); Krishna Buska, San Diego, CA (US); Guillaume Konrad Sautiere, Amsterdam (NL); Anjuman Raha, San Diego, CA (US); Auke Joris Wiggers, Amsterdam (NL); Frank Steven Mayer, San Diego, CA (US); Liang Zhang, San Diego, CA (US); Abhijit Khobare, San Diego, CA (US); Muralidhar Reddy Akula, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/457,079

(22) Filed: Aug. 28, 2023

(65) Prior Publication Data

US 2024/0305785 A1 Sep. 12, 2024

Related U.S. Application Data

(60) Provisional application No. 63/497,411, filed on Apr. 20, 2023, provisional application No. 63/489,306, filed on Mar. 9, 2023.

(51) Int. Cl.
*H04N 19/137* (2014.01)
*H04N 19/159* (2014.01)
(Continued)

(52) U.S. Cl.
CPC ......... *H04N 19/137* (2014.11); *H04N 19/159* (2014.11); *H04N 19/176* (2014.11); *H04N 19/192* (2014.11)

(58) Field of Classification Search
None
See application file for complete search history.

(56) References Cited

U.S. PATENT DOCUMENTS 6,421,467 B1 7/2002 Mitra
11,374,952 B1 6/2022 Coskun et al.
(Continued)

OTHER PUBLICATIONS

Haojie et al. ("Hao") ("Neural Video Coding Using Multiscale Motion Compensation and Spatiotemporal Context Model", IEEE Transactions on Circuits and Systems for Video Technology, vol. 31, No. 8, Aug. 1, 2021 (Aug. 1, 2021), pp. 3182-3196, XP093158945, USA, ISSN: 1051-8215, DOI: 10.1109/TCSVT.2020.3035680).*
(Continued)

*Primary Examiner* — Edemio Navas, Jr.
(74) *Attorney, Agent, or Firm* — QUALCOMM Incorporated; Espartaco Diaz Hidalgo

(57) ABSTRACT

An example computing device may include memory and one or more processors. The one or more processors may be configured to parallel entropy decode encoded video data from a received bitstream to generate entropy decoded data. The one or more processors may be configured to predict a motion vector based on the entropy decoded data. The one or more processors may be configured to decode a motion vector residual from the entropy decoded data. The one or more processors may be configured to add the motion vector residual and motion vector. The one or more processors may be configured to warp previous reconstructed video data with an overlapped block-based warp function using the motion vector to generate predicted current video data. The one or more processors may be configured to sum the (Continued)

predicted current video data with a residual block to generate current reconstructed video data.

32 Claims, 21 Drawing Sheets

(51) Int. Cl.
    *H04N 19/176*     (2014.01)
    *H04N 19/192*     (2014.01)

(56) References Cited

U.S. PATENT DOCUMENTS

| | | | |
|---|---|---|---|
| 11,532,155 | B1 | 12/2022 | Garimella et al. |
| 11,599,972 | B1* | 3/2023 | Xu ............... G06N 3/045 |
| 11,825,090 | B1 | 11/2023 | Said |
| 11,869,221 | B2 | 1/2024 | Johnston et al. |
| 2003/0108099 | A1 | 6/2003 | Nagumo et al. |
| 2007/0092122 | A1* | 4/2007 | Xiao .................. H04N 19/577 |
| | | | 382/128 |
| 2010/0074356 | A1 | 3/2010 | Ashikhmin |
| 2010/0215101 | A1* | 8/2010 | Jeon .................. H04N 19/583 |
| | | | 375/E7.243 |
| 2012/0232913 | A1 | 9/2012 | Terriberry et al. |
| 2013/0094831 | A1 | 4/2013 | Suzuki |
| 2015/0179166 | A1 | 6/2015 | Nagao |
| 2016/0219261 | A1* | 7/2016 | Chen ............... H04N 19/597 |
| 2017/0064302 | A1 | 3/2017 | Na et al. |
| 2019/0265955 | A1 | 8/2019 | Wolf |
| 2020/0027247 | A1 | 1/2020 | Minnen et al. |
| 2020/0099954 | A1 | 3/2020 | Hemmer et al. |
| 2020/0275130 | A1 | 8/2020 | Bokov et al. |
| 2020/0351509 | A1 | 11/2020 | Lee et al. |
| 2020/0356835 | A1 | 11/2020 | Robinson et al. |
| 2021/0075937 | A1* | 3/2021 | Hall ..................... H04N 5/21 |
| 2021/0125380 | A1* | 4/2021 | Lee ................... H04N 19/117 |
| 2021/0232872 | A1 | 7/2021 | Ries et al. |
| 2021/0287780 | A1 | 9/2021 | Korani et al. |
| 2022/0272372 | A1 | 8/2022 | Dinh et al. |
| 2022/0375030 | A1* | 11/2022 | Choi ................. G06T 3/4046 |
| 2023/0185953 | A1 | 6/2023 | Weggenmann et al. |
| 2023/0245317 | A1 | 8/2023 | Morard et al. |
| 2023/0262222 | A1 | 8/2023 | Said |
| 2023/0262267 | A1 | 8/2023 | Said et al. |
| 2024/0015318 | A1* | 1/2024 | Pourreza ............ H04N 19/172 |
| 2024/0016456 | A1 | 1/2024 | De Zambotti et al. |
| 2024/0104786 | A1 | 3/2024 | Johnston et al. |
| 2024/0121392 | A1 | 4/2024 | Said |

OTHER PUBLICATIONS

Agustsson E., et al., "Scale-Space Flow for End-to-End Optimized Video Compression", 2020 IEEE/CVF Conference on Computer Vision and Pattern Recognition (CVPR), IEEE, Jun. 13, 2020 (Jun. 13, 2020), pp. 8500-8509, XP033805553, 10 Pages.

Akiyo., et al., Xiph.org Video Test Media [derf's collection], Xiph.org, pp. 1-18.

Aminabadi R.Y., et al., "DeepSpeed Inference: Enabling Efficient Inference of Transformer Models at Unprecedented Scale", arXiv:2207.00032v1 [cs.LG], Jun. 30, 2022, 13 Pages.

Balle., J,, et al., "Integer Networks for Data Compression with Latent-variable Models", Published as a conference paper at ICLR 2019, pp. 1-10.

Balle J., et al., "Variational Image Compression with A Scale Hyperprior", arXiv:1802.01436v2 [eess.IV], May 1, 2018, XP055632204, pp. 1-23.

Bengio Y., et al., "Estimating or Propagating Gradients Through Stochastic Neurons for Conditional Computation", Computer Science and Operations Research Department, Montreal University, Aug. 15, 2013, pp. 1-12, arXiv preprint arXiv: 1308.3432.v1 [cs.LG].

Bossen F., et al., "VTM Software Manual", JVET-Software Manual, Joint Video Experts Team (JVET) of ITU-T SG16 WP3 and ISO/IEC JTC1/SC29/WG5, Date saved: Oct. 26, 2023, pp. 1-64.

Bossen F., "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, CH Jan. 14-23, 2013, JCTVC-L1100, 4 Pages.

Bross B., et al.,"Developments in International Video Coding Standardization After AVC, with an Overview of Versatile Video Coding (VVC)", Proceedings of the IEEE, vol. 109, No. 9, Sep. 2021, pp. 1463-1493.

Brummer B., et al., "End-to-end Optimized Image Compression with Competition of Prior Distributions", arxiv.org, Cornell University Library, 201 Olin Library Cornell University Ithaca, NY 14853, Nov. 17, 2021, XP091100718, 6 Pages.

Cao J., et al., "Extreme Learning Machine with Affine Transformation Inputs in an Activation Function", IEEE Transactions on Neural Networks and Learning Systems, vol. 30, No. 7, Jul. 2019, pp. 2093-2107.

Dimitriadis S., et al., "Revealing Cross-Frequency Causal Interactions during a Mental Arithmetic Task through Symbolic Transfer Entropy: A Novel Vector-Quantization Approach", IEEE Transactions on Neural Systems and Rehabilitation Engineering: A Publication of the IEEE Engineering in Medicine and Biology Society, Sep. 2016, 13 Pages, DOI: 10.1109/TNSRE.2016.2516107, URL: https://www.researchgate.net/publication/291187046.

Ding D., et al., "Advances in Video Compression System Using Deep Neural Network: A Review and Case Studies", Proceedings of the IEEE, vol. 109, No. 9, Sep. 2021, pp. 1494-1520.

Gabrie M., et al., "Entropy and Mutual Information in Models of Deep Neural Networks", 32nd Conference on Neural Information Processing Systems (NeurIPS 2018), Montréal, Canada, 2018, pp. 1-11.

Galpin F., et al., "Entropy Coding Improvement for Low-complexity Compressive Auto-Encoders", arXiv:2303.05962v1 [eess.IV] Mar. 10, 2023, InterDigital, Inc. Rennes, France, 10 Pages.

Golinski A., et al., "Feedback Recurrent Autoencoder for Video Compression", arXiv:2004.04342v1 [ cs.LG], Apr. 9, 2020, pp. 1-29.

Habibian A., et al., "Video Compression with Rate-Distortion Autoencoders", arXiv:1908.05717v2 [eess.IV], Nov. 13, 2019, Cornell University Library, 201 Olin Library Cornell University, Ithaca, NY, 14853, Aug. 14, 2019, 14 Pages, Nov. 13, 2019, XP081531236.

He D., et al., "Post-Training Quantization for Cross-Platform Learned Image Compression", arXiv:2202.07513v2 [eess.IV], Nov. 30, 2022, 25 Pages.

Hong W., et al., "Efficient Neural Image Decoding via Fixed-Point Inference", IEEE, Transactions on Circuits and Systems for Video Technology, vol. 31, No. 9, Sep. 2021, pp. 3618-3630.

ITU-T: HSTP-VID-WPOM Working Practices Using Objective Metrics for Evaluation of Video Coding Efficiency Experiments, Technical Paper, Telecommunication Standardization Sector of ITU, Jul. 3, 2020, pp. 13.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Kaeli D., et al., "Heterogeneous Computing with OpenCL 2.0 Third Edition", Elsevier Science, Burlington, 2015, pp. 1-330.

Kingma D.P., et al., "An Introduction to Variational Autoencoders", Foundations and Trends in Machine Learning, arXiv:1906.02691v3 [cs.LG] Dec. 11, 2019, 89 pgs.

Kingma D.P., et al., "Auto-Encoding Variational Bayes", ICLR 2014 Conference, Dec. 2013, pp. 1-14, arXiv preprint arXiv:1312.6114v10 [stat.ML] May 1, 2014.

Koyuncu E., et al., "Device Interoperability for Learned Image Compression with Weights and Activations Quantization", arXiv:2212.01330v1 [eess.IV], Dec. 2, 2022, IEEE, pp. 1-5.

(56) References Cited

OTHER PUBLICATIONS

Le H., et al., "MobileCodec: Neural Inter-Frame Video Compression on Mobile Devices", arxiv.org, Cornell University Library, 201 Olin Library Cornell University Ithaca, NY 14853, Jul. 18, 2022, 8 Pages, XP091273560.
Li J., et al., "Deep Contextual Video Compression", arXiv:2109.15047v2 [eess.IV], Dec. 14, 2021, 35th Conference on Neural Information Processing Systems, Sydney, Australia, 2021, 19 Pages.
Li J., et al., "Hybrid Spatial-Temporal Entropy Modelling for Neural Video Compression", arXiv:2207.05894v1 [eess.IV], Jul. 13, 2022, 17 Pages.
Li J., et al., "Neural Video Compression with Diverse Contexts", arXiv:2302.14402v3 [eess.IV], Mar. 14, 2023, 19 Pages.
Lu G., et al., "DVC: An End-To-End Deep Video Compression Framework", arXiv:1812.00101v3 [eess.IV], Apr. 7, 2019, IEEE/CVF Conference on Computer Vision and Pattern Recognition (CVPR), IEEE, Jun. 15, 2019, XP033686979, 14 Pages.
Ma S., et al., "Image and Video Compression with Neural Networks: A Review", arxiv.org, IEEE Transactions on Circuits and Systems for Video Technology, Cornell University Library, 201 Olin Library Cornell University Ithaca, NY, 14853, Apr. 10, 2019, XP081165996, pp. 1-16.
Mentzer F., et al., "M2T: Masking Transformers Twice for Faster Decoding", arXiv:2304.07313v1 [eess.IV], Apr. 14, 2023, 13 Pages.
Mercat A., et al., "UVG Dataset: 50/120fps 4K Sequences for Video Codec Analysis and Development", Ultra Video Group, Tampere University, Finland, 2020, 6 Pages.
Minnen D., et al., "Joint Autoregressive and Hierarchical Priors for Learned Image Compression", 32nd Conference on Neural Information Processing Systems, Montreal, Canada, 2018, 10 Pages.
Nagel M., et al., "A White Paper on Neural Network Quantization", arXiv:2106.08295v1 [cs.LG], Jun. 15, 2021 Cornell University Library, 201 Olin Library Cornell University Ithaca, NY 14853, Jun. 15, 2021, 27 pages, XP081990169.
Nogaki S., et al., "An Overlapped block Motion Compensation for High Quality Motion Picture Coding", Proceedings of the International Symposium on Circuits and Systems, San Diego, May 10-13, 1992; [Proceedings of the International Symposium on Circuits and Systems, (ISCAS)], New York, IEEE, US, vol. 1, May 3, 1992 (May 3, 1992), pp. 184-187, XP010061071.
Orchard M.T., et al., "Overlapped Block Motion Compensation: an Estimation-theoretic Approach", IEEE Transactions on Image Processing, IEEE Service Center, Piscataway, NJ, US, vol. 3, No. 5, Sep. 1, 1994, pp. 693-699, XP000476843, ISSN: 1057-7149, DOI: 10.1109/83.334974.
Pearlman W.A., et al., "Digital Signal Compression: Principles and Practice", Cambridge University Press, 2011, 439 pages.
Pourreza R., et al., "Boosting Neural Video Codecs by Exploiting Hierarchical Redundancy", arXiv:2208.04303v2 [eess.IV], Sep. 16, 2022, Qualcomm Technologies, pp. 1-11.
Qualcomm: "World's First Software-Based Neural Video Decoder Running HD Format in Real-Time on a Commercial Smartphone [Video] Qualcomm AI Research demonstrates 1280x704 HD video being decoded real-time at 30+ frames per second on Snapdragon 888", Jun. 17, 2021, pp. 1-6.
Rippel O., et al., "ELF-VC: Efficient Learned Flexible-Rate Video Coding", arXiv:2104.14335v1 [eess.IV] Apr. 29, 2021, 14 Pages.
Rippel O., et al., "Learned Video Compression", arXiv:1811.06981v1 [eess.IV], Nov. 16, 2018, 2019 IEEE/CVF International Conference on Computer Vision(ICCV), IEEE, Oct. 27, 2019 (Oct. 27, 2019), pp. 3453-3462, XP033723727, 11 Pages, DOI: 10.1109/ICCV.2019.00355 [Retrieved on Feb. 24, 2020].
Rozendaal T.V., et al., "Instance-Adaptive Video Compression: Improving Neural Codecs by Training on the Test Set", arXiv:2111.10302v2 [eess.IV] Jun. 23, 2023, Qualcomm Technologies, pp. 1-29.
Rozendaal T.V., et al., "Overfitting for Fun and Profit: Instance-adaptive Data Compression", arXiv:2101.08687v2 [cs.LG], Jun. 1, 2021, Published as a Conference Paper at ICLR 2021, pp. 1-18.
Said A., "Arithmetic Coding", Chapter 5, 2003, pp. 101-152.
Said A., et al., "Compressed Data Organization for High Throughput Parallel Entropy Coding", LG Electronics Mobile Research, San Jose, CA, USA, Sep. 2015, 9 Pages.
Said A., et al., "Optimized Learned Entropy Coding Parameters for Practical Neural-Based Image and Video Compression", arxiv.org, Cornell University Library, 201 Olin Library Cornell University Ithaca, NY 14853, Jan. 20, 2023, XP091419131, 5 Pages.
Said A., "Introduction to Arithmetic Coding—Theory and Practice", Technical Report, Apr. 21, 2004, pp. 1-67, Retrieved from the Internet: URL: http://www.hpl.hp.com/techreports/2004/HPL-2004-76.pdf.
Shi J., et al., "Rate-Distortion Optimized Post-Training Quantization for Learned Image Compression", arXiv: 2211.02854v3 [eess.IV], Oct. 9, 2023, IEEE, pp. 1-16.
Shi Y., et al., "AlphaVC: High-Performance and Efficient Learned Video Compression", Huawei Technologies, Beijing China, 16 Pages.
Siddegowda S., et al., "Neural Network Quantization with AI Model Efficiency Toolkit (AIMET)", arXiv:2201.08442v1 [cs.LG] Jan. 20, 2022, pp. 1-39.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.
Sun H., et al., "End-to-End Learned Image Compression with Fixed Point Weight Quantization", arXiv:2007.04684v1 [eess.IV], Jul. 9, 2020, 5 Pages.
Sun H., et al., "End-to-End Learned Image Compression with Quantized Weights and Activations", arXiv:2111.09348v1 [eess.IV], Nov. 17, 2021, Journal of Latex Class Files, vol. 14, No. 8, Aug. 2015, pp. 1-14.
Sun H., et al., "Learned Image Compression with Fixed-point Arithmetic", Picture Coding Symposium (PCS), IEEE, 2021, 5 Pages.
Sun H., et al., "Q-LIC: Quantizing Learned Image Compression with Channel Splitting", arXiv:2205.14510v1 [eess.IV], May 28, 2022, pp. 1-9.
Theis L., et al., "Lossy Image Compression with Compressive Autoencoders", arxiv.org, Cornell University Library, 201 Olin Library Cornell University Ithaca, NY14853, Mar. 1, 2017 (Mar. 1, 2017), XP080753545, pp. 1-19.
Tkalcic M., et al., "Colour Spaces—Perceptual, Historical and Applicational Background", EUROCON Ljubljana, Slovenia, IEEE, 2003, pp. 304-308.
Tomar S., "Converting Video Formats with FFmpeg", Linux Journal, Apr. 28, 2006, pp. 1-4.
Wang H., et al., "MCL-JCV: A JND-Based H.264/AVC Video Quality Assessment Dataset", 2016 IEEE International Conference on Image Processing (ICIP), 2016, pp. 1509-1513.
Wiegand T., et al., "Overview of the H.264 / AVC Video Coding Standard", IEEE Transactions On Circuits and Systems for Video Technology, Jul. 2003, pp. 1-19.
Xue T., et al., "Video Enhancement with Task-Oriented Flow", International Journal of Computer Vision, arXiv:1711.09078v3 [cs.CV] Nov. 10, 2019, pp. 1-20.
Zhao J., et al., "A Universal Encoder Rate Distortion Optimization Framework for Learned Compression", 2021 IEEE/CVF Conference on Computer Vision and Pattern Recognition Workshops (CVPRW) , IEEE, Jun. 19, 2021, pp. 1880-1884, XP033967384, 5 Pages, Retrieved on Aug. 25, 2021.
Zhu Y., et al., "Transformer-Based Transform Coding", Sep. 29, 2021, XP093005391, the whole document, pp. 1-35.
International Search Report and Written Opinion—PCT/US2024/018215—ISA/EPO—May 17, 2024, 13 Pages.
Liu H., et al., "Neural Video Coding Using Multiscale Motion Compensation and Spatiotemporal Context Model", IEEE Transactions on Circuits and Systems for Video Technology, vol. 31, No. 8, Aug. 1, 2021, pp. 3182-3196, XP093158945, section III, figures 1, 2, 4, 5.
Zhao S., et al., "Global Matching with Overlapping Attention for Optical Flow Estimation", 2022 IEEE/CVF Conference on Com-

(56) References Cited

OTHER PUBLICATIONS puter Vision and Pattern Recognition (CVPR), IEEE, Jun. 18, 2022, pp. 17571-17580, XP034194379, section 3, figure 2.

* cited by examiner

| | Model | Model architecture | | params | | kMACs/px | | BD-rate |
| --- | --- | --- | --- | --- | --- | --- | --- | --- |
| | | warping | prior | send | recv | send | recv | |
| Baseline | I QODEC (no finetuning) | overlap block | mean-scale | 12,417,220 | 6,295,302 | 64.93 | 24.52 | 0.0% |
| Warping | II block warp | block warp | mean-scale | 12,628,614 | 6,295,302 | 64.93 | 24.52 | 19.2% |
| | III dense warp | dense warp | mean-scale | 12,491,623 | 6,229,387 | 153.67 | 113.59 | -6.0% |
| | IV conditional conv | no warp | mean-scale | 9,770,467 | 6,122,211 | 80.72 | 57.35 | 51.2% |
| Prior | V scale-only prior | overlap block | scale | 11,863,876 | 5,741,958 | 63.84 | 23.44 | 0.6% |
| Training | VI QODEC (+ finetuning) | overlap block | mean-scale | 12,417,220 | 6,295,302 | 64.93 | 24.52 | -14.0% |

FIG. 8

| | weights | fixed grid | | entropy bottleneck | | | rest | type | BD rate |
|---|---|---|---|---|---|---|---|---|---|
| | | pixels | flow | symbols | latent | scale | | | |
| I | CODEC float 32 | ✗ | ✗ | ✗ | ✗ | ✗ | ✗ | ✗ | PTQ | 0.0% |
| II | Fixed quantizers only | ✗ | ✓ | ✓ | ✓ | ✗ | ✗ | ✗ | PTQ | 11.3% |
| III | Fixed quantizers + weights | ✓ | ✓ | ✓ | ✓ | ✗ | ✗ | ✗ | PTQ | 13.5% |
| IV | All except latent bottleneck | ✓ | ✓ | ✓ | ✓ | ✗ | ✗ | ✓ | PTQ | 53.0% |
| V | All except latent bottleneck + scale | ✓ | ✓ | ✓ | ✓ | ✗ | ✓ | ✓ | PTQ | 53.0% |
| VI | All, latent step size = 1 | ✓ | ✓ | ✓ | ✓ | ✓ | ✓ | ✓ | PTQ | 244.7% |
| VII | All, latent step size = 0.25 | ✓ | ✓ | ✓ | ✓ | ✓ | ✓ | ✓ | PTQ | 140.9% |
| VIII | All, latent step size = 0.25 + QAT | ✓ | ✓ | ✓ | ✓ | ✓ | ✓ | ✓ | QAT | 49.1% |
| IX | All, latents int16 | ✓ | ✓ | ✓ | ✓ | int-16 | ✓ | ✓ | PTQ | 53.0% |
| X | All, latents int16 + QAT | ✓ | ✓ | ✓ | ✓ | int-16 | ✓ | ✓ | QAT | 24.2% |

FIG. 12

|  | | Stage 1 Training | Stage 2 finetuning | Stage 3 PTQ | Stage 4 QAT |
|---|---|---|---|---|---|
| Data Size | batchsize | 8 | 16 | 2 | 16 |
|  | gop | 4 | 7 | 3 | 4 |
|  | crop size | 256x256 | 256x384 | 256x256 | 256x256 |
| Loss multipliers | β I-frame | β | β | β | β |
|  | β P-frame | 2β | 2β |  | 2β |
|  | Pframe loss modulation | τ = 1 (no modulation) | τ = 1.2 |  | τ = 1.2 |
|  | predicted flow f^p | λ = 0.1 | λ = 0 |  | λ = 0 |
|  | reconstructed flow f̂ | λ = 0.1 | λ = 0 |  | λ = 0 |
| Optim | lr | 1e-04 | 5e-05 |  | 5e-07 |
|  | lr schedule |  |  |  | cosine decay to 1e-9 |
| Quantization | weights & activations | float32 | float32 | int8 | int8 (STE) |
| Training Time | steps | 1M | 250k | 30 | 100k |
|  | walltime | ~ 4 days | ~ 3 days | ~ 2 minutes | ~ 1 day |

FIG. 13

| | | Parameters (M) | | | | kMACs/px | | | |
|---|---|---|---|---|---|---|---|---|---|
| | | Qodec | MobileCodec | SSF | SSF-Pred | Qodec | MobileCodec | SSF | SSF-Pred |
| Sender | I-frame AE | 5.66 | 6.68 | 9.47 | 9.47 | 116.11 | 211.60 | 118.01 | 118.01 |
| | Motion pred. | 0.21 | - | - | 0.75 | 1.66 | - | - | 6.44 |
| | Motion AE | 5.59 | 11.63 | 9.48 | 10.10 | 28.34 | 175.60 | 118.70 | 124.14 |
| | Residual pred. | - | - | - | 0.75 | - | - | - | 6.32 |
| | Residual AE | 6.82 | 6.57 | 10.09 | 10.09 | 36.59 | 183.60 | 123.45 | 123.45 |
| | Pframe total | 12.42 | 18.20 | 19.57 | 21.69 | 64.93 | 359.20 | 242.15 | 260.35 |
| Receiver | I-frame AE | 2.94 | 2.94 | 5.82 | 5.82 | 93.39 | 130.90 | 94.64 | 94.64 |
| | Motion pred. | 0.21 | - | - | 0.75 | 1.66 | - | - | 6.44 |
| | Motion AE | 2.91 | 5.98 | 5.83 | 6.45 | 9.3 | 156.20 | 94.64 | 100.08 |
| | Residual pred. | - | - | - | 0.75 | - | - | - | 6.32 |
| | Residual AE | 3.18 | 2.75 | 6.44 | 6.44 | 13.36 | 102.90 | 100.08 | 100.08 |
| | Pframe total | 6.30 | 8.65 | 12.27 | 14.39 | 24.52 | 259.10 | 194.72 | 212.92 |
| | Average (GoP=16) | 6.09 | 8.29 | 11.87 | 13.85 | 28.82 | 251.09 | 188.47 | 205.53 |

FIG. 14

| | BD-rate relative to | | | | | | | | |
|---|---|---|---|---|---|---|---|---|---|
| | H.264 (ffmpeg) | H.265 (ffmpeg) | H.265 (HM) | MobileCodec fp32 [16] | MobileCodec int8 [16] | QODEC int8 | QODEC fp32 | SSF-Pred [27] | SSF [27] |
| H.264 (ffmpeg) | 0.0 % | 51.8 % | 100.2 % | -65.4 % | -78.9 % | -65.1 % | -32.9 % | 20.8 % | -33.0 % |
| H.265 (ffmpeg) | -34.1 % | 0.0 % | 31.9 % | -77.2 % | -86.1 % | -77.0 % | -55.8 % | -20.4 % | -55.9 % |
| H.265 (HM) | -50.0 % | -24.2 % | 0.0 % | -82.7 % | -89.5 % | -82.6 % | -66.5 % | -39.6 % | -66.6 % |
| MobileCodec fp32 [16] | 188.7 % | 338.2 % | 477.9 % | 0.0 % | -39.1 % | 0.7 % | 93.6 % | 248.8 % | 93.3 % |
| MobileCodec int8 [16] | 374.3 % | 620.0 % | 849.5 % | 64.3 % | 0.0 % | 65.4 % | 218.1 % | 473.1 % | 217.6 % |
| QODEC int8 (ours) | 186.8 % | 335.4 % | 474.1 % | -0.7 % | -39.5 % | 0.0 % | 92.4 % | 246.5 % | 92.0 % |
| QODEC fp32 (ours) | 49.1 % | 126.3 % | 198.5 % | -48.4 % | -68.6 % | -49.0 % | 0.0 % | 80.2 % | -0.2 % |
| SSF-Pred [27] | -17.2 % | 25.6 % | 65.7 % | -71.3 % | -82.6 % | -71.1 % | -44.5 % | 0.0 % | -44.6 % |
| SSF [27] | 49.4 % | 126.7 % | 199.0 % | -48.3 % | -68.5 % | -47.9 % | 0.2 % | 80.5 % | 0.0 % |

FIG. 15

| num threads | device | Decoding time | rate overhead naive | rate overhead optimized |
|---|---|---|---|---|
| 1 | CPU | 20 ms | 0.6 % | 0.6 % |
| 8 | CPU | 16 ms | 0.6 % | 0.6 % |
| 256 | GPU | 18 ms | 2.1 % | 1.1 % |
| 512 | GPU | 11 ms | 3.9 % | 2.0 % |
| 1024 | GPU | 6 ms | 7.0 % | 3.6 % |

FIG. 18

EFFICIENT WARPING-BASED NEURAL VIDEO CODEC

This application claims the benefit of U.S. Provisional Application No. 63/489,306, filed Mar. 9, 2023, and the benefit of U.S. Provisional Application No. 63/497,411, filed Apr. 20, 2023, the entire contents of each of which are incorporated herein by reference.

TECHNICAL FIELD

This disclosure relates to video encoding and decoding, including the encoding and decoding of images and video data.

BACKGROUND

Digital media capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video coders/formats such as AOMedia Video 1 (AV1) that was developed by the Alliance for Open Media. The video devices may transmit, receive, encode, decode, and/or store digital video information more efficiently by implementing such video coding techniques.

SUMMARY

In general, this disclosure describes techniques for media compression, including techniques for video and/or image encoding and decoding. Media (e.g., images and/or video) compression methods based on neural networks can be competitive to current standards and provide several advantages. Neural-based coding techniques are commonly designed and tested using high-precision floating-point mathematics. However, as neural network-based media compression techniques move into practical implementation and deployment, neural network weights and activation functions are typically quantized and represented with low-precision integers, rather than high-precision floating-point numbers, in order to improve speed and power consumption.

This disclosure addresses problems that occur when the neural network variables related to entropy coding are quantized. Neural network variables may be important to the design of a neural-based video/image compression scheme because such variables define compression efficiency. Furthermore, the very specific properties of the entropy coding variables are not taken into account by general tools for optimizing quantization in neural networks. Testing has shown that the worst quantization effects may occur exactly on some of the most common use cases, and the losses caused by the worst quantization effects may not be recovered by re-training the neural network.

This disclosure describes techniques to optimize the definition of the trained entropy coding variables, so that the information that is most important for effective entropy coding is best preserved when represented with low-precision integers. Testing has also shown how the techniques described herein may be used to reduce or minimize the amount of memory needed for entropy coding. This disclosure describes a general approach for entropy coding design, as well as specific solutions and implementations for commonly used Gaussian distributions. The techniques of this disclosure may be generally applied to any neural-based compression techniques, but the examples described below focus on techniques for image and video compression.

In one example, a device for decoding video data includes: memory for storing the video data, the video data comprising previous reconstructed video data and current reconstructed video data; and one or more processors configured to: parallel entropy decode encoded video data from a received bitstream to generate entropy decoded data; predict a block-based motion vector based on the entropy decoded data to generate a predicted motion vector; decode a motion vector residual from the entropy decoded data; add the motion vector residual to the predicted motion vector to generate the block-based motion vector; warp the previous reconstructed video data with an overlapped block-based warp function using the block-based motion vector to generate predicted current video data; and sum the predicted current video data with a residual block to generate the current reconstructed video data.

In another example, a method of decoding video data includes parallel entropy decoding encoded video data from a received bitstream to generate entropy decoded data; predicting a block-based motion vector based on the entropy decoded data to generate a predicted motion vector; decoding a motion vector residual from the entropy decoded data; adding the motion vector residual and the predicted motion vector to generate the block-based motion vector; warping previous reconstructed video data with an overlapped block-based warp function using the block-based motion vector to generate predicted current video data; and summing the predicted current video data with a residual block to generate current reconstructed video data.

In another example, a device for decoding video data includes means for parallel entropy decoding encoded video data from a received bitstream to generate entropy decoded data; means for predicting a block-based motion vector based on the entropy decoded data to generate a predicted motion vector; means for decoding a motion vector residual from the entropy decoded data; means for adding the motion vector residual and the predicted motion vector to generate the block-based motion vector; means for warping previous reconstructed video data with an overlapped block-based warp function using the block-based motion vector to generate predicted current video data; and means for summing the predicted current video data with a residual block to generate current reconstructed video data.

In another example, a computer-readable storage medium is encoded with instructions that, when executed, cause a programmable processor to: parallel entropy decode encoded video data from a received bitstream to generate entropy decoded data; predict a block-based motion vector based on the entropy decoded data to generate a predicted motion vector; decode a motion vector residual from the entropy decoded data; add the motion vector residual to the predicted motion vector to generate the block-based motion vector; warp previous reconstructed video data with an overlapped block-based warp function using the block-based motion vector to generate predicted current video data; and sum the predicted current video data with a residual block to generate current reconstructed video data.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 8 is a table depicting example results of neural coder model architecture ablation according to one or more aspects of this disclosure.

FIG. 12 is a table depicting example BD rate performance results for various quantizations for an example neural coder in accordance with one or more aspects of this disclosure.

FIG. 13 is a table depicting different example hyperparameters for different training stages in accordance with one or more aspects of this disclosure.

FIG. 14 is a table depicting example model complexities for a variety of neural coders in accordance with one or more aspects of this disclosure.

FIG. 15 is a table depicting BD rate performance results for various example neural coders in accordance with one or more aspects of this disclosure.

FIG. 18 is a table depicting inference speed and rate overhead for different parallelization techniques in accordance with one or more aspects of this disclosure.

DETAILED DESCRIPTION

Figure 1:
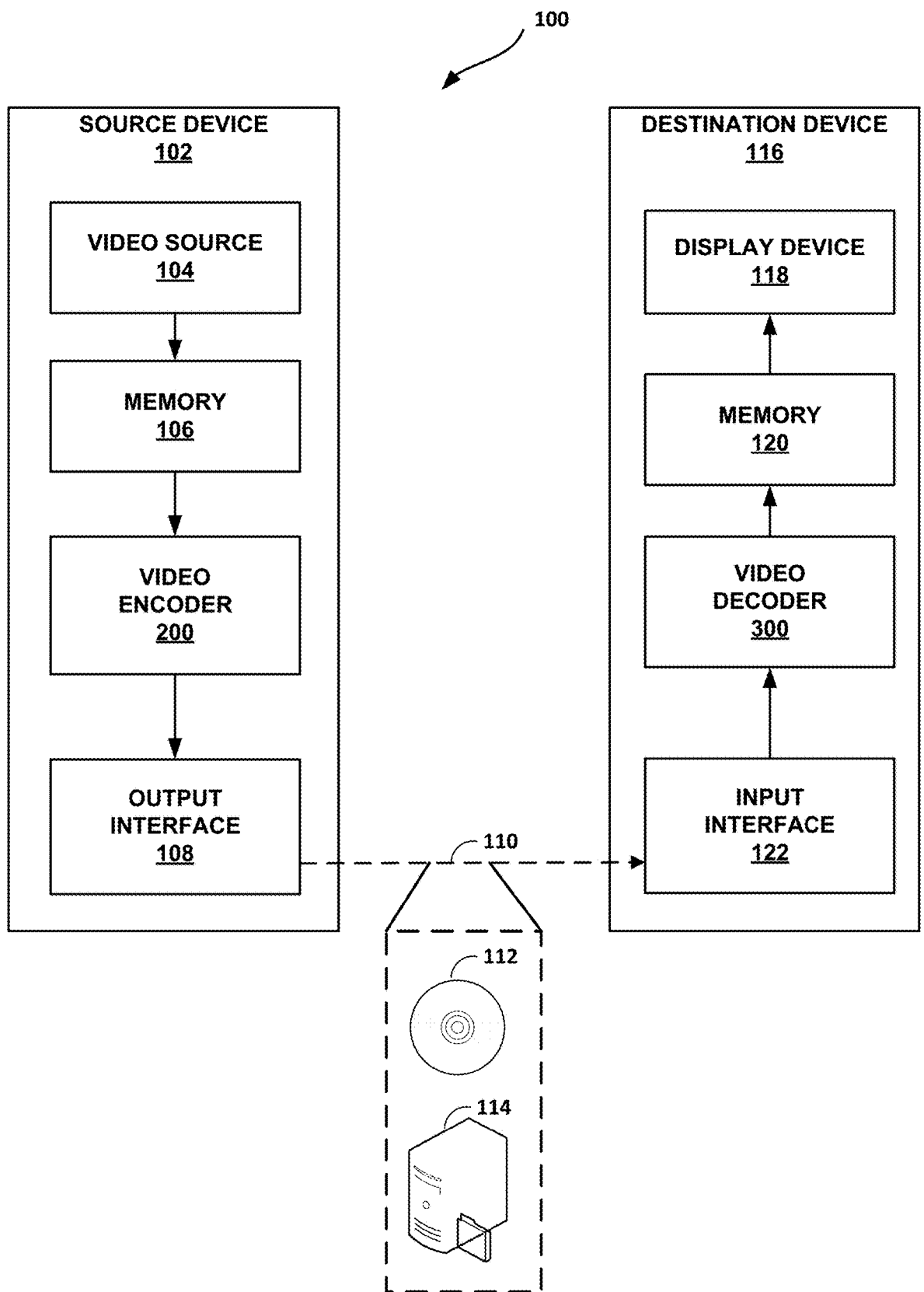
FIG. 1 is a block diagram illustrating an example media encoding and decoding system that may perform the techniques of this disclosure.

This disclosure describes techniques for encoding and decoding media data (e.g., images or videos) using neural-network-based media coding techniques. In particular, this disclosure describes techniques for using warping to decode encoded media data. In particular, this disclosure describes techniques for neural-network-based media coding that uses block-based warping. Example techniques of this disclosure include a 1080p YUV420 architecture, predictive modeling to improve compression performance, quantization-aware training, parallel entropy coding (for example, on a GPU), and/or pipelined inferencing. The techniques of this disclosure may improve the performance of a neural-network-based media coder. Such an improved neural-network-based media coder may be utilized in a battery powered device, such as a mobile device (e.g., a smartphone).

Neural video coders have recently become competitive with standard coders, such as HEVC, in a low-delay setting. However, most neural coders include large floating-point networks which use pixel-dense warping operations for temporal modeling, making them too computationally intensive for deployment on mobile devices. This disclosure describes techniques including adaptations to a strong neural encoder/decoder (coder) for mobile deployment.

Existing neural compression models for video coding demonstrate relatively good (e.g., high quality) compression performance, but are relatively computationally expensive to run, especially on battery powered devices, such as mobile devices. As such, there may be a desire for a media coder, such as a video coder, having a relatively low compute footprint that also provides relatively good compression performance.

According to the techniques of this disclosure, a relatively efficient model architecture is provided for 1080p YUV420 video. Such an architecture utilizes a predictive model to improve compression performance. The video coder may employ quantization-aware training. The video coder may employ efficient block-based warping. The video coder may employ parallel entropy coding on a GPU (e.g., in addition to, or in lieu of entropy coding on a CPU). In some examples, the video coder may use pipelined inference to reach a throughput of >30 fps for 1080×2048 video frames.

In particular, this disclosure describes techniques for performing low precision weight and activation quantization in mean-scale hyperprior models. This disclosure also describes an efficient overlapped block motion compensation technique available in a neural accelerator to replace pixel-dense warping. The techniques of this disclosure may provide a coder that may outperform other practical neural coders, by relatively large margins, with up to 40% Bjontegaard-Delta (BD)-rate savings, while reducing FLOP count by ~9× on the receiver-side. This complexity reduction allows scaling to real-time full HD video decoding on device. Furthermore, the resulting coder may operate in the perceptually relevant YUV color space, and perform entropy coding in parallel on a mobile GPU. This disclosure also describes an ablation of the coder architecture to provide a discussion of the effect of motion compensation schemes and quantization.

Neural video compression has seen significant progress in recent years. In the low-delay P-frame setting, recent neural-network based compression techniques have outperformed reference implementations of standard coders, like ITU-T H.265/HEVC. However, current neural coders are typically computationally expensive, encoding and decoding is not in real-time, and reported runtimes are usually measured on powerful desktop GPUs. Additionally, many neural video coders assume availability of pixel-based or feature-based warping operations, which may be memory intensive and hard to efficiently implement on a resource-constrained device, such as a mobile phone.

On the other hand, standard coders typically have fast software implementations, or efficient silicon implementations specifically designed for consumer hardware. Although efficient neural coders exist, they typically (1) replace dense optical flow warping with a convolutional motion compensation network and (2) use a scale-only hyperprior. However, both such choices have a negative impact on rate-distortion (R-D) performance, even before weight and activation quantization is applied.

This disclosure describes a neural P-frame coder architecture (sometimes referred to as "QODEC" or Quantized on Device End-to-end Coder) designed for deployment in a mobile device. In some examples, this architecture may include three mean-scale hyperpriors and prediction networks for the flow and residual. Reducing model width, removing the residual predictor, and removing redundant warp operations may reduce computational complexity. The warping operator itself may be efficiently implemented using a block-based motion compensation algorithm.

In some examples, quantizing weights and activations may be 8-bit values, which may further improve efficiency. The techniques of this disclosure may use a highly efficient quantization scheme for the scale of each mean-scale hyperprior. However, naive quantization of the hyperprior mean may lead to catastrophic loss in R-D performance. Therefore, instead, this disclosure describes alternative techniques involving low precision quantization of the mean and scale parameters of mean-scale hyperpriors. A GPU may perform parallel entropy coding to massively increase parallelism to tens of thousands of threads, allowing more extremely efficient entropy decoding on a mobile device.

These techniques may lead to BD-rate savings, while enabling, e.g., 30 fps full-HD real-time decoding on a mobile device. Additionally, warping operator and quantization may be selected, which allows for determination of key factors for effective, mobile-friendly design of neural coders.

Neural coders are neural network-based machine learning systems that are trained to compress data from examples. One model for neural image compression is the mean-scale hyperprior. This model is a hierarchical variational autoencoder with quantized latent variables, sometimes referred to as a compressive autoencoder.

After being successful in the image domain (e.g., coding of static images), neural coders were extended to the video setting. Follow-up research used motion compensation and residual coding using task-specific autoencoders. These architectures were further augmented using predictive models that predict the flow, residual or both, leading to an improvement in RD performance. Recent work shows that conditional coding can be more powerful than residual coding, but conditional coding may lead to aggregating error.

Neural image coders have outperformed the strongest standard image coders, but typically, their strong performance comes with an increase in computational complexity. Although many works now report on runtime or memory use, the deployment of neural image coders has received relatively little attention.

A common methodology for complexity reduction is quantization. For neural compression, cross-platform reproducibility has been studied for neural quantization, as entropy coding is sensitive and may break due to floating-point rounding errors. Post-training quantization has been studied for both weights and activations, with the aim to improve the BD-rate gap between the integer-quantized models and their floating-point counterparts. For instance, channel splitting involves convolution output channels most sensitive to quantization being split up and quantized using custom dynamic range, while other channels are pruned away to keep the floating point operations (FLOP) complexity somewhat constant. However, such techniques typically assume per-channel quantization. Studies have shown that per-channel weight quantization can benefit from efficient integer arithmetic.

Because the techniques of this disclosure may be implemented on-device, the techniques of this disclosure may use hardware-friendly per-channel weight and per-layer activation quantization schemes for a final model. Bottleneck quantization in a mean-scale hyperprior structure may be implemented in a variety of ways, and may require careful consideration when quantizing activation and performing entropy coding. This disclosure describes how quantization can be performed in the bottleneck, especially for the latents and means path. This disclosure also describes how parametrization for a scale parameter may enable essentially no loss in rate performance when performing 8-bit quantization on the scale.

In the video setting, some techniques measure computational complexity through runtime or multiply-and-accumulate operations. For example, a specific convolutional block may be used to improve inference speed and BD-rate. Overfitting the coder to the instance to compress may drastically reduce receiver-side computational complexity. A neural coder that decodes videos on-device may use per-channel model quantization and parallel entropy coding, including a motion compensation subnetwork.

The techniques of this disclosure include an efficient block-based warping technique, combined with a predictive model architecture in YUV-420 space. Additionally, these techniques include massively parallelized entropy coding on a GPU. As a result, these techniques can decode full HD videos (1080p resolution) at 30 fps on a mobile device.

FIG. 1 is a block diagram illustrating an example media encoding and decoding system that may perform the techniques of this disclosure. In the context of this disclosure, media may include any digital file to be compressed, including video data and/or images. The example techniques of this disclosure are generally directed to coding (encoding and/or decoding) video data and/or image data. While examples of FIG. 1 will be described with reference to media encoding and decoding, the techniques of this application are equally applicable to the encoding and decoding of any type of data file using neural-based compression techniques.

As shown in FIG. 1, system 100 includes a source device 102 that provides encoded media data to be decoded and displayed by a destination device 116, in this example. In particular, source device 102 provides the media data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for entropy coding a neural-based media compression system. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100, as shown in FIG. 1, is merely one example. In general, any digital media encoding and/or decoding device may perform techniques for entropy coding a neural-based media compression system. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories.

In some examples, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input interface 122 to video decoder 300. In some examples, portions of memories 106, 120 may be allocated as one or more buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage video such as a hard drive, Blu-ray discs, DVDs, CD-ROMs, flash memory, volatile or non-volatile memory, or any other suitable digital storage video for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving video data from file server 114, or other such protocols for retrieving video data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300. Display device 118 displays decoded pictures of the decoded video data to a user. Display device 118 may represent any of a variety of display devices such as a liquid crystal display (LCD), a plasma display, an organic light emitting diode (OLED) display, or another type of display device.

According to the techniques of this disclosure, video decoder 300 may be a quantized on-device efficient coder. Video decoder 300 may use a warping and residual based hyperprior model designed for YUV 4:2:0 color space that runs efficiently on-device. Video decoder 300 may use an efficient block-based warping algorithm and exploit lower dimensionality of the flow and pixel space inputs, which may reduce model complexity. Additionally, video decoder 300 may model weight and activations using 8-bit integers. Video decoder 300 may also use a parallel entropy coding algorithm on a GPU core and use a pipelined inference algorithm that leverages multiple available cores in a neural processor. Taken together, these various techniques may allow video decoder 300 to decode full-HD video (1080×1920) at more than 30 fps.

For example, video decoder 300 may receive YUV 4:2:0 inputs and use a flow-predictor. The YUV color space may be better aligned with human perceptual quality than other color spaces, and the 4:2:0 subsampling scheme may exploit the difference in sensitivity of the human eye between luminance and color. In particular, video decoder 300 may subsample the chroma channels by two times (2×) along the height and width dimensions, leading to a 2× reduction in number of elements compared to the RGB or YUV 4:4:4 color spaces, which in turn reduces network complexity.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODER) in a respective device. A device including video encoder 200 and/or video decoder 300 may comprise an integrated circuit, a microprocessor, and/or a wireless communication device, such as a cellular telephone.

Entropy coding is a fundamental part of video compression systems. The entropy coding process is responsible for optimizing the conversions between video information and the compressed data bitstreams, aiming to obtain the most compact representation possible. Unlike other elements of video compression, entropy coding is a lossless process, i.e., it fully preserves information.

Several techniques were developed for implementing efficient entropy coding in image and video compression standards. More recently it has been shown that new compression methods based on deep learning and neural networks are approaching the performance of conventional methods, while offering several other practical advantages.

Figure 2:
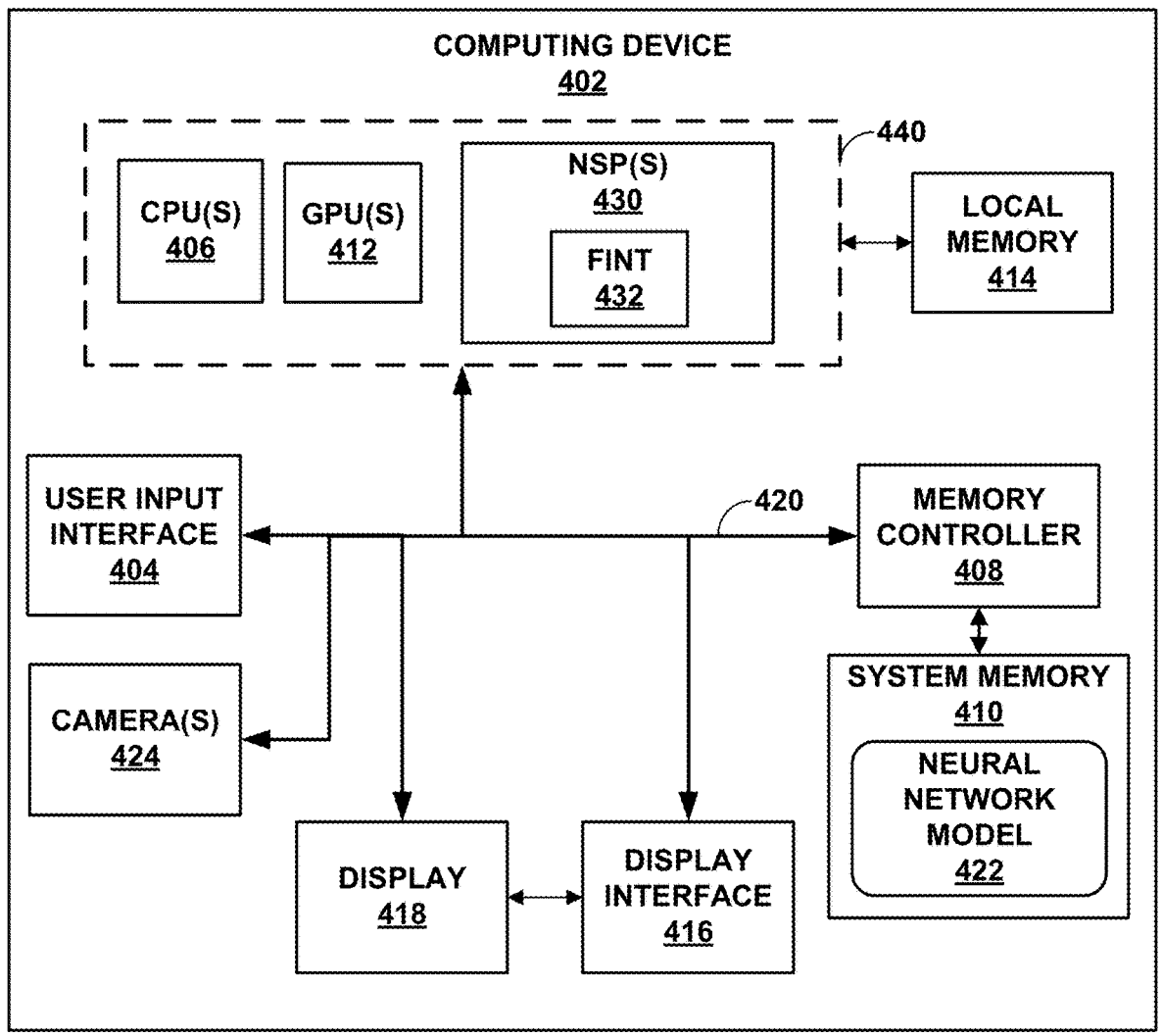
FIG. 2 is a block diagram illustrating an example computing device that may perform techniques of this disclosure.

FIG. 2 is a block diagram illustrating an example computing device that may perform techniques of this disclosure. Computing device 402 may comprise a mobile device (such as, e.g., a smart phone, a mobile telephone, a cellular telephone, a satellite telephone, and/or a mobile telephone handset), a personal computer, a desktop computer, a laptop computer, a computer workstation, a video game platform or console, a landline telephone, an Internet telephone, a handheld device such as a portable video game device or a personal digital assistant (PDA), a personal music player, a video player, a display device, a television, a television set-top box, a server, an intermediate network device, a mainframe computer, a mobile computing device, a vehicle head unit, self-driving or autonomous driving vehicle, a robot, or any other type of device having imaging or video capabilities.

As illustrated in the example of FIG. 2, computing device 402 includes a user input interface 404, a CPU(S) 406, a memory controller 408, a system memory 410, a graphics processing unit (GPU) 412, a neural network signal processor (NSP) 430, a Frame Interpolation (FINT) kernel 432, which may be implemented in NSP(S) 430, a local memory 414, a display interface 416, a display 418, bus 420, and one or more cameras 424. User input interface 404, CPU(S) 406, memory controller 408, GPU(S) 412, FINT kernel 432, NSP(S) 430, display interface 416, and one or more cameras 424 may communicate with each other using bus 420. Bus 420 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 2 is merely exemplary, and other configurations of computing devices and/or other graphics processing systems with the same or different components may be used to implement the techniques of this disclosure.

One or more cameras 424 may include any image capture hardware that includes one or more image sensors and one or more lens, and that is configured to capture at least one frame of image data and to transfer the at least one frame of image data to CPU(S) 406, GPU(S) 412, NSP(S) 430, and/or FINT kernel 432.

CPU(s) 406 may comprise one or more general-purpose and/or special-purpose processors that controls operation of computing device 402. A user may provide input to computing device 402 to cause CPU(s) 406 to execute one or more software applications. The software applications that execute on CPU(s) 406 may include, for example, an operating system, a word processor application, an email application, a spread sheet application, a media player application, a video game application, a graphical user interface application, and/or other programs. The user may provide input to computing device 402 via one or more input devices (not shown) such as a keyboard, a mouse, a microphone, a touch pad or another input device that is coupled to computing device 402 via user input interface 404.

Memory controller 408 facilitates the transfer of data going into and out of system memory 410. For example, memory controller 408 may receive memory read and write commands, and service such commands with respect to system memory 410 in order to provide memory services for the components in computing device 402. Memory controller 408 is communicatively coupled to system memory 410. Although memory controller 408 is illustrated in the example computing device 402 of FIG. 1 as being a processing module that is separate from both CPU(s) 406 and system memory 410, in other examples, some or all of the functionality of memory controller 408 may be implemented on one or both of CPU(s) 406 and system memory 410.

System memory 410 may store program modules and/or instructions that are accessible for execution by CPU(s) 406 and/or data for use by the programs executing on CPU(s) 406. For example, system memory 410 may store user applications and graphics data associated with the applications. System memory 410 may additionally store information for use by and/or generated by other components of computing device 402. For example, system memory 410 may act as a device memory for one or more GPU(s) 412 and may store data to be operated on by GPU(s) 412 as well as data resulting from operations performed by GPU(s) 412.

System memory 410 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 410 may include instructions that cause CPU(s) 406, GPU(s) 412, NSP(s) 430, and/or FINT kernel 432 to perform the functions ascribed in this disclosure to CPU(s) 406, GPU(s) 412, NSP(s) 430, and FINT kernel 432. Accordingly, system memory 410 may be a computer-readable storage medium having instructions stored thereon that, when executed, cause one or more processors (e.g., CPU(s) 406, GPU(s) 412, NSP(s) 430, and FINT kernel 432) to perform various functions.

In some examples, system memory 410 is a non-transitory storage medium. The term "non-transitory" indicates that the storage medium is not embodied in a carrier wave or a propagated signal. However, the term "non-transitory" should not be interpreted to mean that system memory 410 is non-movable or that its contents are static. As one example, system memory 410 may be removed from computing device 402, and moved to another device. As another example, memory, substantially similar to system memory 410, may be inserted into computing device 402. In certain examples, a non-transitory storage medium may store data that can, over time, change (e.g., in RAM).

GPU(s) 412 may be configured to perform graphics operations to render one or more graphics primitives to display 418. Thus, when one of the software applications executing on CPU(s) 406 requires graphics processing, CPU(s) 406 may provide graphics commands and graphics data to GPU(s) 412 for rendering to display 418. The graphics commands may include, e.g., drawing commands such as a draw call, GPU state programming commands, memory transfer commands, general-purpose computing commands, kernel execution commands, etc. In some examples, CPU(s) 406 may provide the commands and graphics data to GPU(s) 412 by writing the commands and graphics data to system memory 410, which may be accessed by GPU(s) 412. In some examples, GPU(s) 412 may be further configured to perform general-purpose computing for applications executing on CPU(s) 406.

GPU(s) 412 may, in some instances, be built with a highly parallel structure that provides more efficient processing of vector operations than CPU(s) 406. For example, GPU(s) 412 may include a plurality of processing elements that are configured to operate on multiple vertices or pixels in a parallel manner. The highly parallel nature of GPU(s) 412 may, in some instances, allow GPU(s) 412 to draw graphics images (e.g., GUIs and two-dimensional (2D) and/or three-dimensional (3D) graphics scenes) onto display 418 more quickly than drawing the scenes directly to display 418 using CPU(s) 406. In addition, the highly parallel nature of GPU(s) 412 may allow GPU(s) 412 to process certain types of vector and matrix operations for general-purpose computing applications more quickly than CPU(s) 406. In some examples, video encoder 200 or video decoder 300 may make use of the highly parallel structure of GPU(s) 412 to perform parallel entropy coding according to the techniques of this disclosure.

GPU(s) 412 may, in some instances, be integrated into a motherboard of computing device 402. In other instances, GPU(s) 412 may be present on a graphics card that is installed in a port in the motherboard of computing device 402 or may be otherwise incorporated within a peripheral device configured to interoperate with computing device 402. In further instances, GPU(s) 412 may be located on the same microchip as CPU(s) 406 forming a system on a chip (SoC). GPU(s) 412 and CPU(s) 406 may include one or more processors, such as one or more microprocessors, application specific integrated circuits (ASICs), field programmable gate arrays (FPGAs), digital signal processors (DSPs), or other equivalent integrated or discrete logic circuitry.

CPU(s) 406, GPU(s) 412, NSP(s) 430, and FINT kernel 432 may together be referred to as one or more processors 440. In describing the various techniques that may be performed by one or more processors 440, it should be understood that such techniques may be performed by one or more of CPU(s) 406, GPU(s) 412, NSP(s) 430, and FINT kernel 432. It should be understood that the techniques disclosed herein are not necessarily limited to being performed by CPU(s) 406, GPU(s) 412, NSP(s) 430, and/or FINT kernel 432, but may also be performed by any other suitable hardware, device, logic, circuitry, processing units, and the like of computing device 402.

GPU(s) 412 may be directly coupled to local memory 414. Thus, GPU(s) 412 may read data from and write data to local memory 414 without necessarily using bus 420. In other words, GPU(s) 412 may process data locally using a local storage, instead of off-chip memory. This allows GPU(s) 412 to operate in a more efficient manner by eliminating the need of GPU(s) 412 to read and write data via bus 420, which may experience heavy bus traffic. In some instances, however, GPU(s) 412 may not include a separate cache, but instead utilize system memory 410 via bus 420. Local memory 414 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

As described, CPU(s) 406 may offload graphics processing to GPU(s) 412, such as tasks that require massive parallel operations. As one example, graphics processing requires massive parallel operations, and CPU(s) 406 may offload such graphics processing tasks to GPU(s) 412. However, other operations such as matrix operations may also benefit from the parallel processing capabilities of GPU(s) 412. In these examples, CPU(s) 406 may leverage the parallel processing capabilities of GPU(s) 412 to cause GPU(s) 412 to perform non-graphics related operations.

CPU(s) 406, GPU(s) 412, NSP(s) 430, and/or FINT kernel 432 may store rendered image data in a frame buffer that is allocated within system memory 410. Display interface 416 may retrieve the data from the frame buffer and configure display 418 to display the image represented by the rendered image data. In some examples, display interface 416 may include a digital-to-analog converter (DAC) that is configured to convert the digital values retrieved from the frame buffer into an analog signal consumable by display 418. In other examples, display interface 416 may pass the digital values directly to display 418 for processing.

Display 418 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display, an organic light-emitting-diode (OLED) display, or another type of display unit. Display 418 may be integrated within computing device 402. For instance, display 418 may be a screen of a mobile telephone handset or a tablet computer. Alternatively, display 418 may be a stand-alone device coupled to computing device 402 via a wired or wireless communications link. For instance, display 418 may be a computer monitor or flat panel display connected to a personal computer via a cable or wireless link.

System memory may store neural network model 422. Neural network model 422 may include one or more artificial neural networks (also referred to as neural networks) trained to receive input data of one or more types and to, in response, provide output data of one or more types.

A neural network (e.g., neural network model 422) may include a trainable or adaptive algorithm utilizing nodes that define rules. For example, a respective node of a plurality of nodes may utilize a function, such as a non-linear function or if-then rules, to generate an output based on an input. A respective node of the plurality of nodes may be connected to one or more different nodes of the plurality of nodes along an edge, such that the output of the respective node includes the input of the different node. The functions may include parameters that may be determined or adjusted using a training set of inputs and desired outputs along with a learning rule, such as a back-propagation learning rule. The back-propagation learning rule may utilize one or more error measurements comparing the desired output to the output produced by the neural network to train the neural network by varying the parameters to minimize the one or more error measurements.

In some examples, neural network model 422 is trained to perform classification of input data. That is, neural network model 422 may be trained to label input data to classify input data into one or more classes or categories. Neural network model 422 may perform classification of input data by determining, for the input data, a confidence score for each of a plurality of classes that indicates a degree to which it is believed that the input data should be classified into the corresponding class. In other examples, neural network model 422 may determine a probabilistic distribution over a set of classes to indicate the probability that the input data belongs to each of the set of classes.

In some examples, neural network model 422 may be trained to perform computer vision tasks such as image classification, object detection, and/or image segmentation. Such computer vision tasks may be useful for computer vision applications such as autonomous driving. For example, neural network model 422 may be trained to perform image classification to determine which objects are in an image or video, such as by being trained to classify an image as either including a particular object or not including the particular object and by assigning one or more labels to the image. In another example, neural network model 422 may be trained to perform object detection to detect what objects are in an image or video and to specify where each of the objects are in the image, and neural network model 422 may be trained to assign one or more labels to each of the one or more objects in the image. In some examples, neural network model 422 may be trained to perform image segmentation to separate an image into regions that delineate potentially meaningful areas for further processing.

In some examples, neural network model 422 may perform one or more computer vision tasks on images captured by one or more cameras 424. That is, one or more cameras 424 may capture an image, and one or more processors 440 may input the image captured by one or more cameras 424 into neural network model 422 to perform one or more computer vision tasks, such as image classification, object detection, and/or image segmentation on the image.

In accordance with one or more aspects of this disclosure, video decoder 300 may be configured to: parallel entropy decode encoded video data from a received bitstream to generate entropy decoded data; predict a block-based motion vector based on the entropy decoded data to generate a predicted motion vector; decode a motion vector residual from the entropy decoded data; add the motion vector residual to the predicted motion vector to generate the block-based motion vector; warp the previous reconstructed video data with an overlapped block-based warp function using the block-based motion vector to generate predicted current video data; and sum the predicted current video data with a residual block to generate the current reconstructed video data.

In accordance with aspects of this disclosure, video decoder 300 may decode hyperlatents; extrapolate a first flow; decode means and scales from the hyperlatents; decode latents based on the scales; reconstruct a second flow and a residual based on the latents and the first flow; warp a previous reconstructed frame using the second flow to generate a warped frame; and add the residual to the warped frame.

Figure 3:
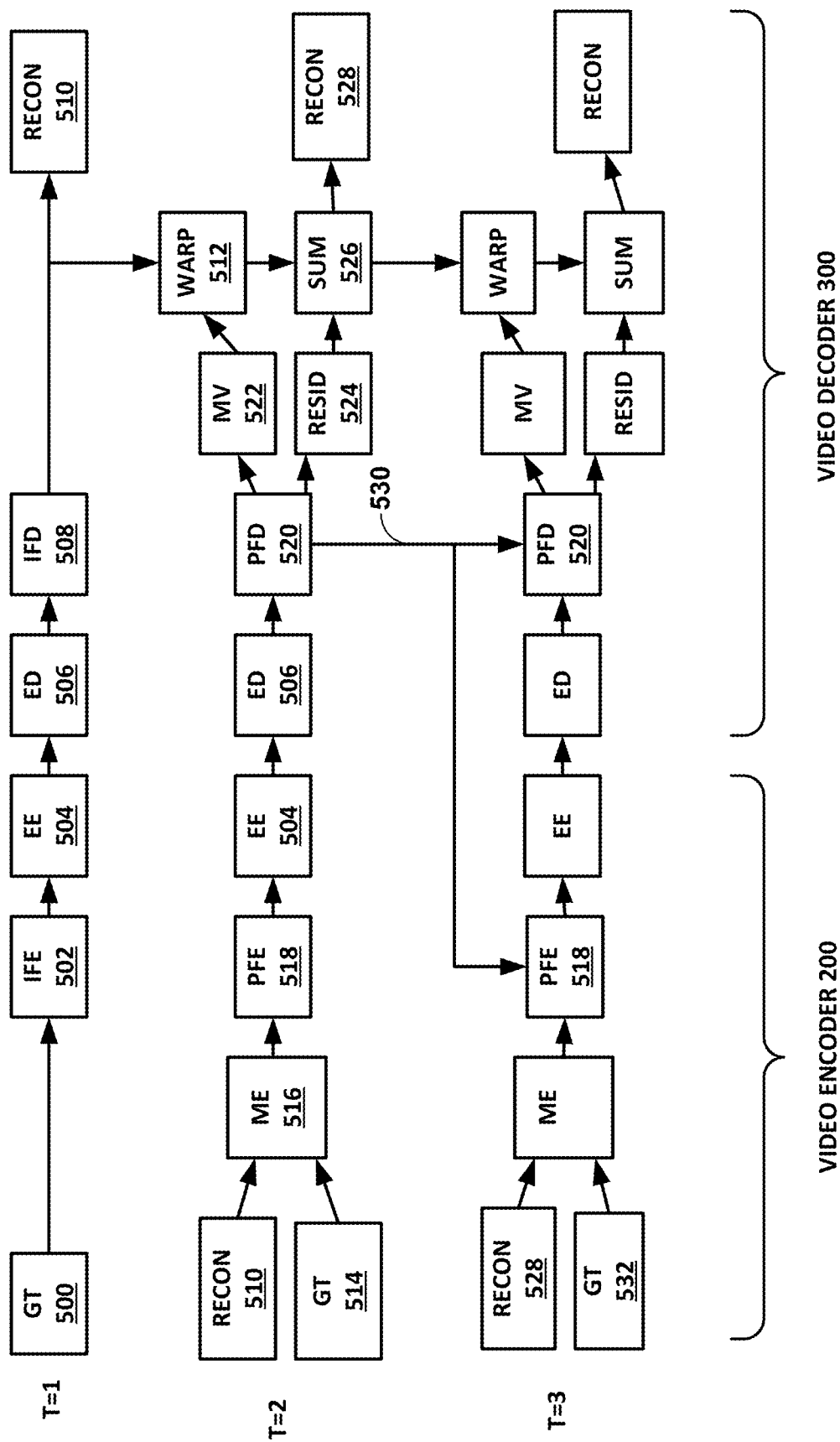
FIG. 3 is a conceptual diagram illustrating an example of end-to-end deep learning of a neural video coder according to one or more aspects of this disclosure.

FIG. 3 is a conceptual diagram illustrating an example of end-to-end deep learning of a neural video coder according to one or more aspects of this disclosure. For example, a video coder (e.g., video encoder 200 and/or video decoder 300) may utilize neural network based I-frame and P-frame compression.

For example, at time T1, video encoder 200 may obtain an I-frame of video data (ground truth (GT) 500) and encode the I-frame using neural network model 422, which may include elements of video encoder 200 discussed herein. Video encoder 200 may encode the I-frame using I-frame encoder (IFE) 502 and entropy encode the encoded I-frame using entropy encoder (EE) 504.

Video decoder 300 may decode the encoded I-frame using neural network model 422 to reproduce a representation of the original I-frame. For example, video decoder 300 may entropy decode the entropy encoded I-frame using entropy decoder (ED) 506. Video decoder 300 may decode the encoded I-frame using I-frame decoder (IFD) 508 to produce a reconstructed frame (recon) 510. Video decoder may use reconstructed frame 510 as input to a warping function (warp) 512 for use with a future decoded P-frame.

At time T2 (after time T1), video encoder 200 may use its own reproduced representation of the original I-frame (video encoder 200 may include a local version of video decoder 300) recon 510 and a P-frame (GT 514). Video encoder 200 may perform motion estimation (ME) 516 of GT 514 (the P-frame) of the video data using the I-frame (recon 510) as a reference frame. Motion estimation 516 may generate a motion vector and/or a motion vector residual which may be encoded as part of encoding the P-frame. Video encoder 200 may encode the P-frame using neural network model 422. For example, video encoder 200 may encode GT 514 using P-frame encoder (PFE) 518. Video encoder 200 may then entropy encode the P-frame using entropy encoder 504.

Video decoder 300 may entropy decode the entropy encoded P-frame using entropy decoder 506. Video decoder 300 may decode the output of the entropy decoder using neural network model 422 to generate a motion vector and a block residual associated with the P-frame. For example, video decoder 300 may use P-frame decoder (PFD) 520 to generate motion vector (MV) 522 and block residual (resid) 524. Video decoder 300 may use warp 512 to warp reconstructed I-frame 510 using motion vector 522 using and sum the resulting warped frame with block residual 524 to generate a reconstructed P-frame (recon 528). An output 530 of neural network model 422 (e.g., decoded P-frame information, such motion vector 522, block residual 524, or other decoded P-frame information) may be fed back into the neural network (e.g., P-frame encoder 518 and/or P-frame decoder 520 of neural network model 422) to train P-frame encoder 518 and P-frame decoder 520, as shown, for use with encoding and/or decoding a new P-frame (GT 532).

Figure 4:
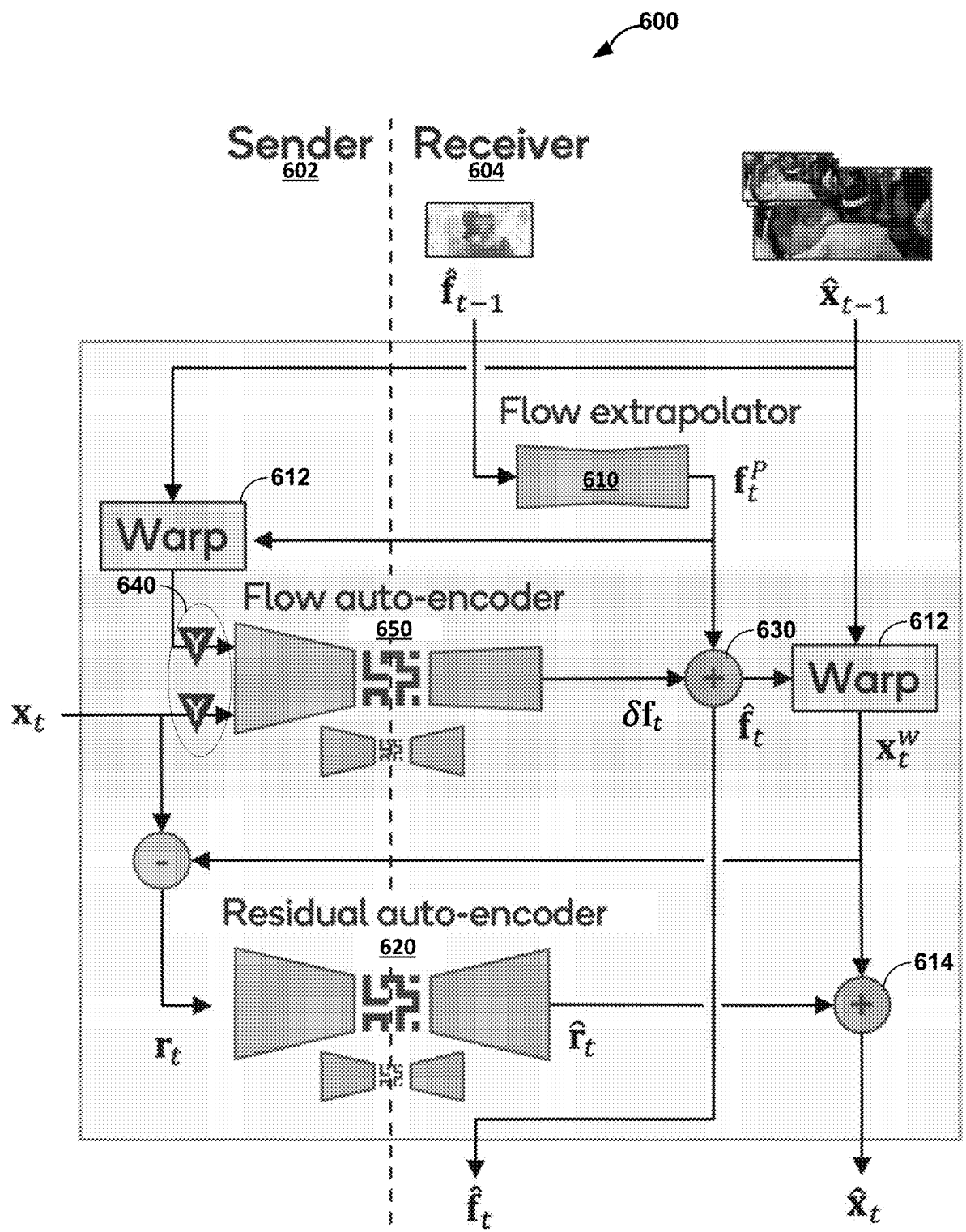
FIG. 4 is an architectural diagram illustrating an example of a neural video coder according to one or more aspects of this disclosure.

FIG. 4 is an architectural diagram illustrating an example of a neural video coder according to one or more aspects of this disclosure. Neural coder 600 may be an example of video encoder 200 and/or video decoder 300. For example, sender 602 may be an example of source device 102, which includes video encoder 200, and receiver 604 may be an example of destination device 116, which include video decoder 300. While neural coder 600 is depicted as including both elements of a video encoder (of sender 602) and elements of a video decoder (of receiver 604), it should be noted that video decoder 300 may be separately implementable in a device or be implemented together with video encoder 200.

Input video data $X_t$, which video encoder 200 may encode, and a reconstructed previous frame $\hat{X}_{t-1}$, may be in a YUV420 color space. By using the YUV420 color space, the complexity of the computations which video encoder 200 or video decoder 300 may perform may be reduced compared to other video data in other color spaces, such as RGB. Additionally, the YUV420 color space may be better aligned with human perceptual quality and may therefore improve human perception of quality in decoded, reproductions of the input video data.

Video encoder 200 or video decoder 300 may include a predictive architecture with a relatively small, flow extrapolator 610. Flow extrapolator 610 may add minimal compute overhead, but may add to improved compression performance. Thus, flow extrapolator 610 may be an efficient flow extrapolator may provide for better compression performance with minimal compute overhead.

Video encoder 200 or video decoder 300 may include FINT kernel 432, which may be implemented in NSP(s) 430, to perform block-based warping 612, which may be overlapped block-based warping, of reconstructed previous frame $\hat{X}_{t-1}$ using the motion vector $\hat{f}_t$.

Video encoder 200 or video decoder 300 may use a parallelized entropy coding algorithm for fast and efficient encoding or decoding of the bitstream, for example, on GPU(s) 412. For example, video encoder 200 or video decoder 300 may use residual autoencoder 620 to perform parallelized entropy coding. For example, parallel entropy coding may include utilizing a plurality of entropy decoding instances or operations simultaneously. Autoencoder 620 may be implemented on GPU(s) 412.

The neural network components of the video encoder 200 or video decoder 300 may be pipelined so that all subsystems (e.g., CPU(s) 406, GPU(s) 412, NSP(s) 430, FINT kernel 432, etc.) work simultaneously to reach a desired framerate.

Neural network model 422 may employ int8 quantization for effective inference. int8 uses 8-bit integers instead of floating-point numbers and integer math instead of floating-point math, which may reduce memory and computing requirements. In some examples, the video encoder 200 or video decoder 300 may use custom quantization operations for the entropy coding procedure to improve compression performance. Training performed on neural network model 422 may be quantization aware.

The use of additive flow prediction (e.g., add 630) instead of warping the flow may remove one computationally expensive warping operation from video decoder 300. The use of Y-channel only (luma only) 640 as input to flow autoencoder 650 may provide for greater compute efficiency for flow estimation.

Due to overlap block-based warping, motion vectors are lower-dimensional leading to reduced compute complexity. Flow autoencoder 650 is further optimized by only inputting the Y-channels of the pixelspace inputs 640. The example neural coder 600, which may be a neural video coder, may be compared to previous neural coders. Specifically, neural coder 600 may be made hardware-friendly by using an efficient block-based warping operator 612 and making the flow extrapolator network 610 more lightweight. Furthermore, the computational graph may be altered compared to other neural coders to reduce the number of warping operations.

Neural coder 600 may include three mean-scale hyperprior autoencoders, e.g., flow extrapolator 610, residual auto-encoder 620, and flow auto-encoder 650. An I-frame autoencoder (e.g., I-frame encoder 502 and/or I-frame decoder 508 of FIG. 3) compresses the first frame $x_1$ in every group of pictures (GoP) and/or outputs a reconstructed frame $\hat{x}_1$. The P-frame model (e.g., P-frame encoder 518 and/or P-frame decoder 520 of FIG. 3) may include a flow-predictor, flow extrapolator 610, which makes a prediction for the current flow $f_t^P$ based on the reconstructed flow from the last timestep $\hat{f}_{t-1}$. The P-frame encoder then compresses the residual flow relative to this prediction: flow autoencoder 650 takes as input the Y channels of the ground truth frame $x_t$ and the last predicted frame warped with the current flow warp $(\hat{x}_{t-1}, f_t^P)$. The P-frame decoder then outputs a delta flow, which is added to the predicted flow to obtain the reconstructed flow $\hat{f}_t = \delta f_t + f_t^P$. Finally, the frame is warped with the reconstructed flow $x_t^w = $ warp $(\hat{x}_{t-1}, \hat{f}_t)$ and the ground truth residual $r = x_t - x_t^w$ is compressed, decoded ($\hat{r}$) and added to the warped frame on the decoder side: $\hat{x}_t = x_t^w + \hat{r}$.

For example, video decoder 300 may parallel entropy decode encoded video data from a received bitstream to generate entropy decoded data. Video decoder 300 may predict (e.g., using flow extrapolator 610) a block-based motion vector $\hat{f}_t$ based on the entropy decoded data to generate a predicted motion vector $f_t^P$. Video decoder 300 may decode a motion vector residual $\delta f_t$ (e.g., using flow auto-encoder 650) from the entropy decoded data. Video decoder 300 may add (e.g., using add 630) the motion vector residual $\delta f_t$ to the predicted motion vector $f_t^P$ to generate the block-based motion vector $\hat{f}_t$. Video decoder 300 may warp the previous reconstructed video data $\hat{X}_{t-1}$ with an overlapped block-based warp function (e.g., using warp 612) using the block-based motion vector $\hat{f}_t$ to generate predicted current video data $x_t^w$. Video decoder 300 may sum (e.g., using sum 614) the predicted current video data $x_t^w$ with a residual block $\hat{r}_t$ to generate the current reconstructed video data $\hat{x}_t$.

Figure 5:
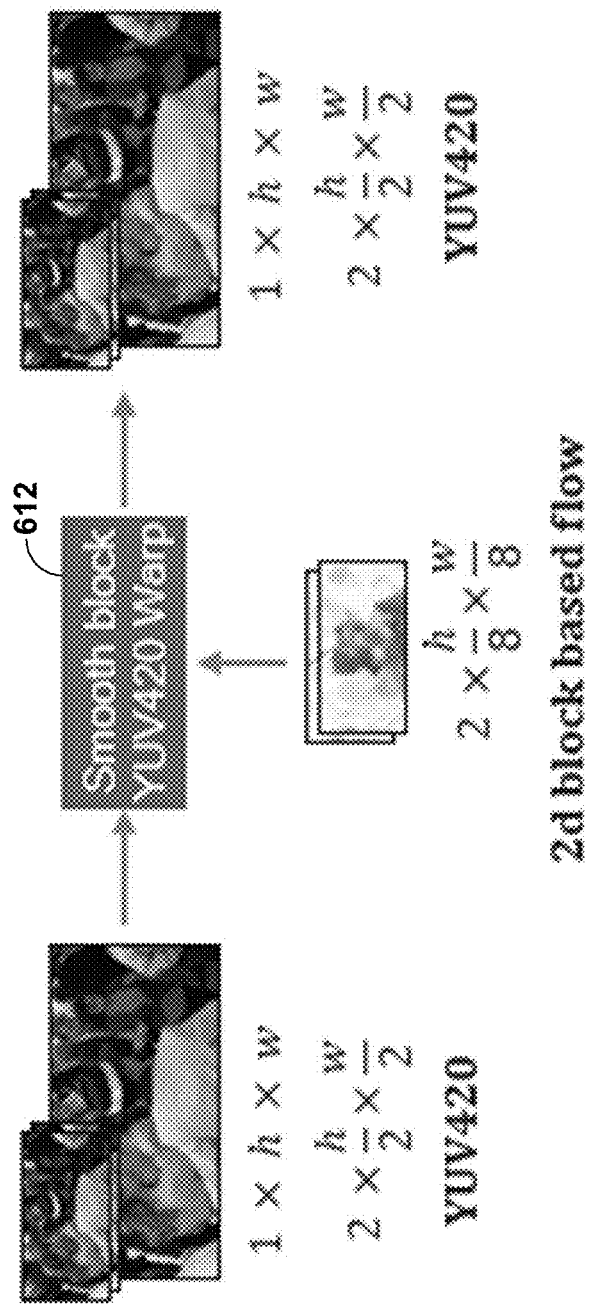
FIG. 5 is a conceptual diagram illustrating an example of block-based warping according to one or more aspects of this disclosure.

FIG. 5 is a conceptual diagram illustrating an example of block-based warping according to one or more aspects of this disclosure. Some neural video coders employ dense RGB scale-space warping, which entails high-dimensional RGB inputs and output, and high-dimensional motion vector input. Processing such high-dimensional data is computationally expensive and power draining. By using an efficient block-based warping 612, for example, on FINT kernel 432, computation complexity may be reduced and power may be saved. In the example of FIG. 5, warping 612 may include an efficient block-based YUV420 warping technique which may be utilized by video encoder 200 or video decoder 300. YUV420 inputs are lower-dimensionally than RGB (e.g., are represented by fewer bits). The use of a block-based motion vector may reduce flow size. Video encoder 200 or video decoder 300 may apply a blending-filter to reduce block artifacts. In some examples, the example of FIG. 5 may be implemented in FINT kernel 432.

Motion compensation is viewed as an essential component of neural video coders. In many neural video coders, pixel-dense warping with a backward mapping is used, where a frame x is warped using a flow-field f. For every pixel i, j in the warped frame, the value is looked up from the reference frame as follows:

$$\text{warp}_{dense}\ (x, f)_{i,j} = x[i + f_x\ [i, j], j + f_y\ [i, j]].$$

Here [·] refers to array indexing, and y sub-indices indicate retrieval of the respective coordinate in the vector field f. For non-integer motion vectors, bilinear or bicubic interpolation may typically be used to compute the pixel intensity. Many previous neural coders use a more space-space based version of warping, where a third blur coordinate is given. While this space-space based version of warping may increase compression performance, it also may incur additional complexity.

As the motion vector f (which may also be referred to as a flow or optical flow) typically may have large homogeneous regions, block-based warping can be used as an alternative to dense warping, with a smaller computational complexity. In block-based warping, the warped frame may be divided into blocks of size b×b. All pixels inside of a block may be looked up from the reference frame using a single shared motion vector. The frame may be warped as follows:

$$\text{warp}_{block}\ (x, f, b)_{i,j} = x\left[i + f_x\left[\left[\frac{i}{b}\right], \left[\frac{j}{b}\right]\right], j + f_y\left[\left[\frac{i}{b}\right], \left[\frac{j}{b}\right]\right]\right]$$

Block-based warping may be more efficient than other types of warping due to the block-wise memory access. However, one downside of block-based warping is that artifacts may occur around the block edges for blocks that have different motion vectors. This potential for artifacts can be addressed or solved by using overlapped block-based motion compensation, where each block is warped multiple times using the N−1 surrounding motion vectors (f) and the results may be averaged using a kernel $w \in R^{b \times b \times N}$ that decays towards the end of the blocks.

For example, an overlapped block warping motion compensation may be represented as:

$$\text{warp}_{block-overlap}\ (x, f, w, b)_{i,j} =$$

$$\Sigma_{k=1}^N w_{i,j,k} \cdot x\left[i + f_x\left[\left[\frac{i}{b}\right] + \Delta_x^k, \left[\frac{j}{b}\right] + \Delta_y^k\right], j + f_y\left[\left[\frac{i}{b}\right] + \Delta_x^k, \left[\frac{j}{b}\right] + \Delta_y^k\right]\right],$$

where $\Delta^k$ is the relative position of the neighboring block (e.g., top-left, center, bottom, etc.), x are the pixel values of the frame to be warped, f is the motion vector (e.g., x and y displacement), w are the weights of the blending kernel, and b is the block size. Note that the warping is conducted in both an x direction and a y direction.

As discussed hereinafter, overlapped block-based warping may lead to better compression performance than block-based warping and may match the performance of dense warping, while leading to better efficiency.

Figure 6:
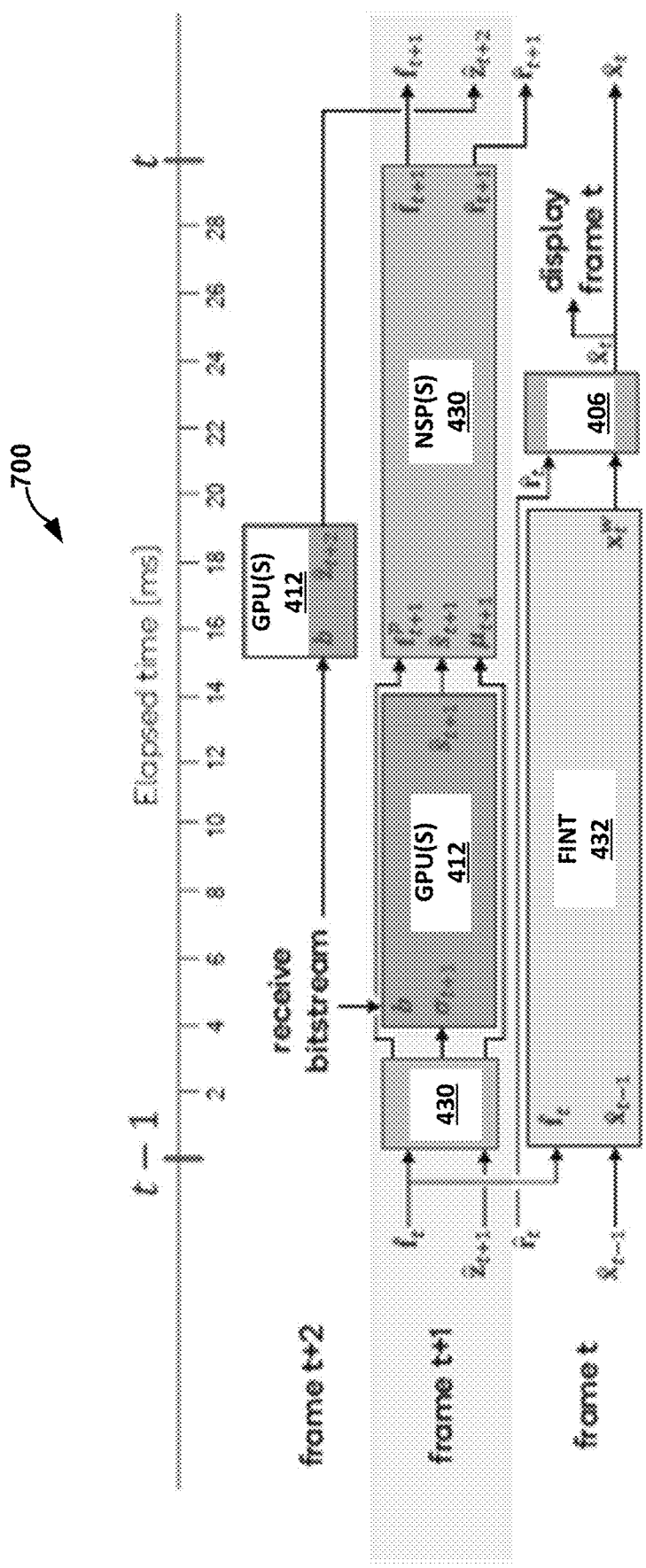
FIG. 6 is an architectural diagram illustrating an example of pipelined inference in video decoder 300.

FIG. 6 is an architectural diagram illustrating an example of pipelined inference in video decoder 300. For example, video decoder 300 may process 3 frames (frame t, frame t+1, and frame t+2) in parallel. This allows a throughput of >30 FPS for fullHD video. In the example of FIG. 6, each stage of pipeline 700 is depicted along with its respective inputs and outputs and is labeled based on an example of which processors of computing device 402 may perform the particular stage of pipeline 900. The width in a horizontal direction of each block of pipeline 700 represents the approximate runtime of that particular stage.

For example, video decoder 300 may decode hyperlatents from the received bitstream. In some examples, video decoder 300 decodes the hyperlatents using GPU(s) 412. Video decoder 300 may extrapolate the flow and decode means and scales from hyperlatents on NSP(s) 430. Video decoder 300 (e.g., via GPU(s) 412) may then decode latents based on the scales. Video decoder 300 (e.g., via NSP(s) 430) may reconstruct the flow and residual, based on the latents and the extrapolated flow. Video decoder 300 may warp a reconstructed frame for a previous timestamp, for example, on FINT kernel 432, using the reconstructed flow. Video decoder 300 may then add a reconstructed residual to the warped frame, for example on CPU(s) 406, to yield a reconstructed P-frame.

Neural coder 600 may use integer quantization for efficient inference. Most weights and activations can be quantized with a small loss in performance. It should be understood that quantization of the latents, and the mean and scale used in entropy coding may use a specific implementation to avoid large performance drops.

Neural coder 600 may include a neural network model (e.g., neural network model 422) that can reach a throughput of 30+ frames per second (FPS) for full HD (1080×1920 pixels) YUV 4:2:0 videos. Since different parts of inferencing can be implemented on different processors or subsystems processors (e.g., of NSP(s) 430), a pipelined architecture, such as that shown in FIG. 6, may efficiently utilize the available compute power. In the example pipeline 700, data from up to three timesteps in the past may be processed simultaneously by using GPU(s) 412, NSP(s) 430, CPU(s) 406, FINT 432 in parallel. In order to obtain required throughput it may be necessary to use parallelization. Unlike a multi-core CPU implementation, which is used concurrently for a variety of tasks, GPU(s) 412 may relatively easily be used to exclusively perform entropy coding. In the case where NSP(s) 430 and GPU(s) 412 are configured to share memory, there may be no delays from copying data between processing elements. The total amount of entropy coding data to be processed may be reduced or minimized by using only 8-bit integers for data elements. Hyperprior networks may be trained to minimize the compression loss caused by using low-precision integer parameters for entropy coding. This approach may be used to limit the amount of memory needed for coding tables to only 1,228 bytes.

The arithmetic coding functions may, for example, be implemented with OpenCL, which include small sized tables. With the small sized tables of OpenCL, parallelization is defined mostly by the number of OpenCL work items, and work group organization may not be critical.

Figure 7:
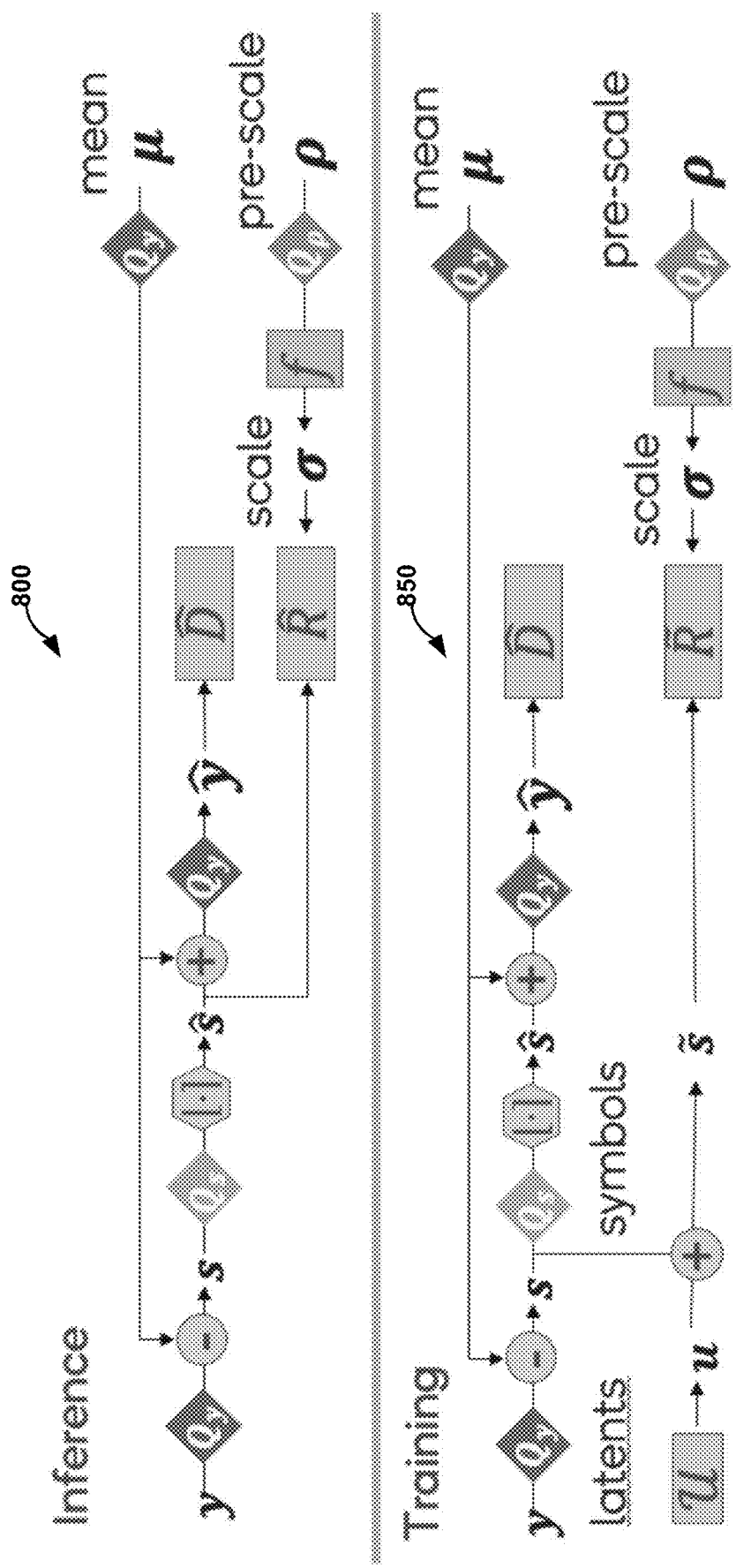
FIG. 7 is a conceptual diagram of an example neural video coder according to one or more aspects of this disclosure.

FIG. 7 is a conceptual diagram of an example neural video coder functions according to one or more aspects of this disclosure. In a floating point example of neural coder 600, only the symbols s are quantized using rounding (rounding operator in figure). For the quantized example of neural coder 600, the quantizers shown as triangles are used. For example, neural coder 600 may perform quantization of, for example, int8, at the location of the triangles depicted in FIG. 7.

In the example of FIG. 7, y represents latents before transmission, s represents symbols, $\hat{s}$ represents integer symbols for entropy coding, $\tilde{s}$ represents noisy symbols used for the rate proxy used during training, $\hat{y}$ represents reconstructed latents used for decoding, σ represents a standard-deviation used for entropy coding, and μ represents a mean over the latents. In the example of FIG. 7, symbols may be an integer grid (e.g., bin width=1) for entropy coding. The latents before transmission and the mean over the latents μ may have sub-integer precision for good compression performance. For example, latents before transmission y and the mean over the latents μ may have a 16-bit length (e.g., use 16-bit quantization) and/or have a bin width of 0.25. It should be noted that this may result in fewer extreme values.

In some examples, a special parametrization of the scale σ, may be used as described in U.S. patent application Ser. No. 17/931,073, filed Sep. 9, 2022, and/or in U.S. patent application Ser. No. 17/814,426, filed Jul. 22, 2022, both of which are hereby incorporated by reference in their entirety.

Existing neural video coders are not necessarily designed for the YUV color space, may require expensive motion compensation techniques, employ a theoretical bitrate or slow entropy coding, and utilize expensive floating-point operations. As such, existing neural video coders are challenging to implement on battery-constrained devices, such as mobile devices (e.g., smartphones).

As there is an interaction between rounding and adding uniform noise and activation quantization, care should be taken when quantizing the latent bottleneck. The latent bottleneck for the meanscale hyperprior is shown in FIG. 7. Functions 800 include functions performed during inference, while functions 850 include functions performed during training. As mentioned above, the quantizers, shown as diamonds, are not added for floating-point versions of the neural coder 600.

As the symbols which are passed through to video decoder 300 in the quantized version of neural coder 600 are always rounded, the symbol quantizer may have a bin width of 1, as $E[y-\mu]=0$ the quantizer is centered quantizer around 0. The values for σ can have a large dynamic range, and quantizing σ to a uniform grid may be detrimental to performance. This can be avoided by using an exponential activation function $f(\rho)=$ . . . where $\rho \in [0, 1]$. Such an activation function may enable one to quantize σ without a loss in performance (see row VI of FIG. 8).

FIG. 8 is a table depicting example results of neural coder model architecture ablation according to one or more aspects of this disclosure. Neural coders represented in the table of FIG. 8 are floating-point coders that have been trained using a first training stage only (e.g., 1 million training steps), except for model VII which is trained for a first training stage and a second training stage (see FIG. 13 hereinafter). The second training stage may be a finetuning stage using, for example, 250,000 steps. Parameters and kMACS/px are shown for the P-frame model only and kMACs/px are computed on a 1080×1920 YUV420 input frame. For an exhaustive complexity analysis see FIG. 14, hereinafter.

The question then remains how to quantize the latents y and the mean u. It might seem logical to quantize the latents and the mean to the same grid as the symbols with a bin width of 1 and a bias of 0. However, as shown in Row VII of FIG. 8, this causes a detrimental drop in compression performance. Instead, neural coder 600 may be configured to have sub-integer precision for the means so that neural coder 600 can correct the rounding error of the latents. With a bin width of 0.25, the performance is almost 2 times better, despite the range of the possible latents decreasing (see row VIII of FIG. 8). Note that the scale-only hyperprior does not suffer from these issues, but as shown in the table of FIG. 8 this model has worse compression performance.

All numbers reported so far are obtained using post-training quantization (PTQ). This is known to be a suboptimal quantization technique, and indeed results in poor compression performance. By following up the PTQ stage with a quantization-aware training (QAT) phase, where the model and quantizer parameters are optimized using gradient descent, neural coder 600 may avoid such poor compression performance. For example, following up the PTQ stage with a QAT phase, compression performance is improved and provides a final performance of 83% BD-rate increase relative to a floating-point model.

Figure 9:
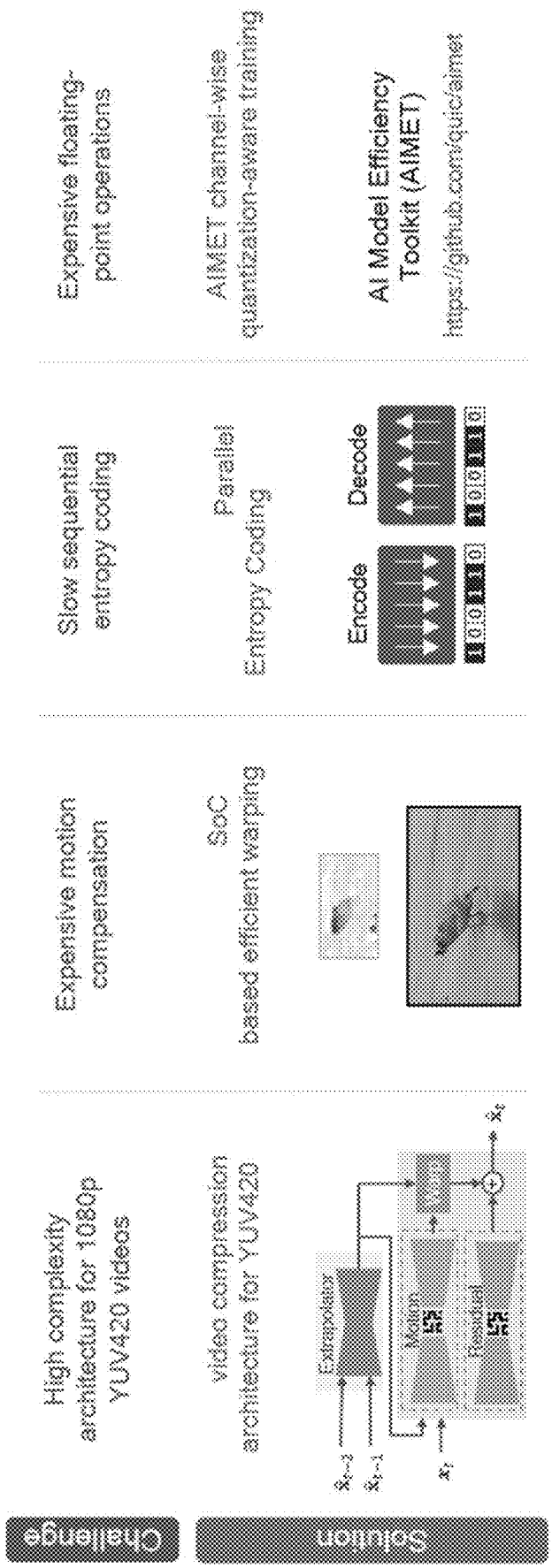
FIG. 9 is a conceptual diagram illustrating example techniques which may be implemented in an example video coder according to one or more aspects of this disclosure.

FIG. 9 is a conceptual diagram illustrating example techniques which may be implemented in an example video coder according to one or more aspects of this disclosure. For example, video encoder 200 or video decoder 300 may include a YUV420 compression architecture as disclosed herein. For example, video encoder 200 or video decoder 300 may include block-based warping as disclosed herein. For example, video encoder 200 or video decoder 300 may include parallel entropy coding as disclosed herein. For example, video encoder 200 or video decoder 300 may include quantization and quantization-aware training, such as AI model efficiency toolkit (AIMET) channel-wise quantization-aware training to improve quantized model accuracy. AIMET is an open-source library for optimizing trained neural network models.

Figure 10:
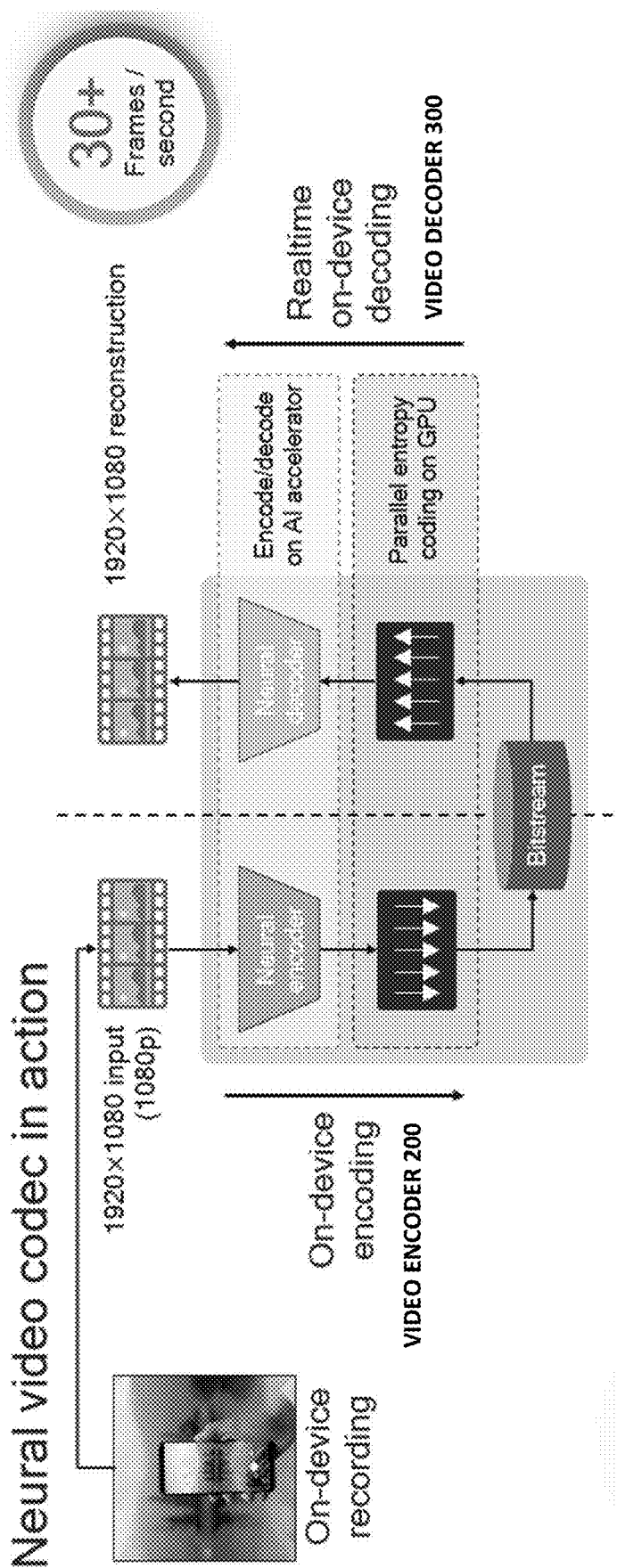
FIG. 10 is a conceptual diagram illustrating an example of a neural video coder on a device according to one or more aspects of this disclosure.

FIG. 10 is a conceptual diagram illustrating an example of a neural video coder on a device according to one or more aspects of this disclosure. In the example of FIG. 10, a device, such as computing device 402, may include a video coder which may include video encoder 200 and/or video decoder 300. Computing device 402 may capture video data using camera(s) 424, for example, in 1920×1080 (1080p) format. Video encoder 200 may utilize neural network model 422 to encode the captured video data and may entropy encode the encoded video data to a bitstream. Video decoder 300 may entropy decode the received bitstream. Video decoder 300 may decode the entropy decoded data to reconstruct the captured video data. Computing device 402 may display the reconstructed captured video data via display 418 in 1080p at greater than or equal to 30 frames per second.

Figure 11:
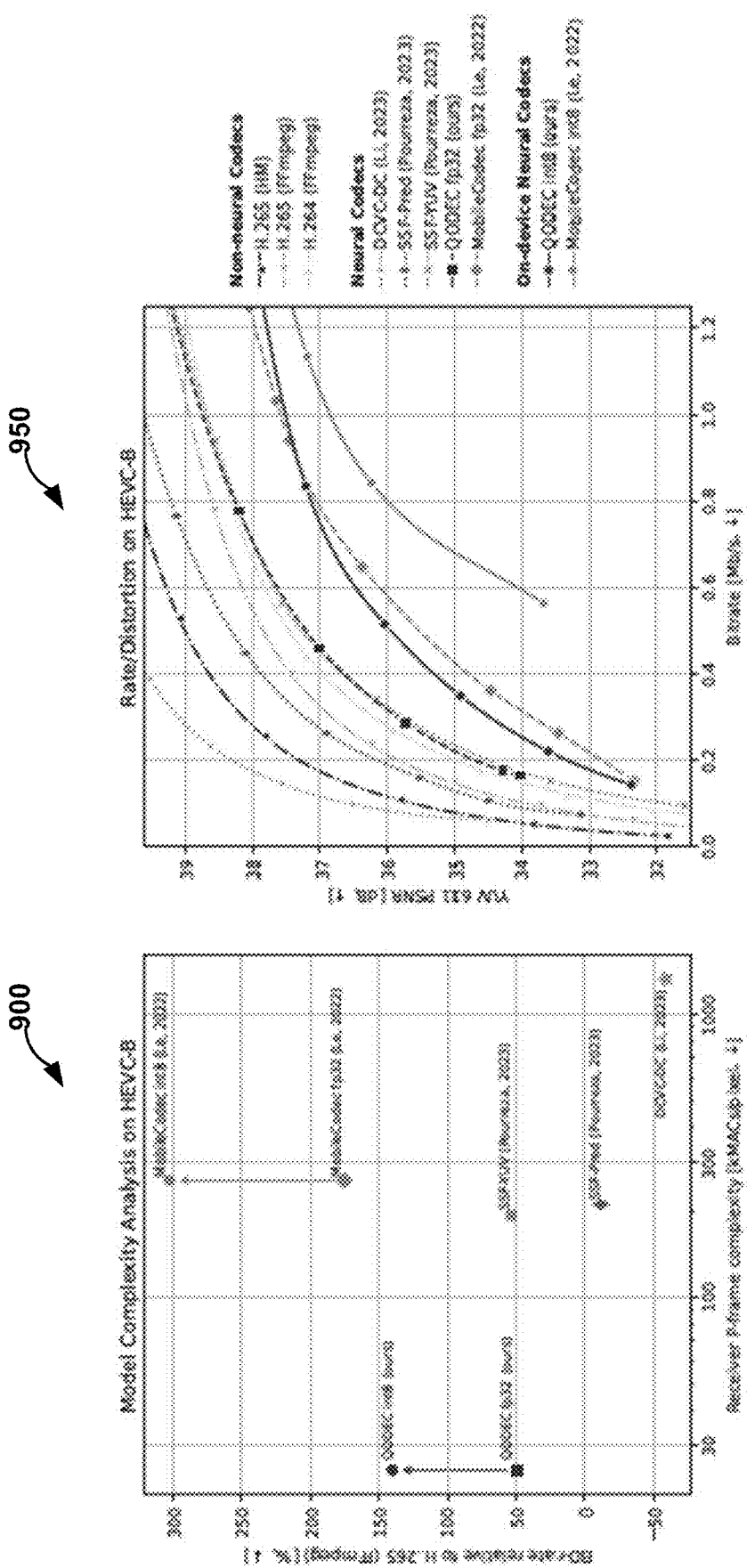
FIG. 11 is a set of graphs that compare compression performance and computations and rate-distortion performance of various techniques compared to the techniques of this disclosure.

FIG. 11 is a set of graphs that compare compression performance and computations and rate-distortion performance of various techniques compared to the techniques of this disclosure. As can be seen in FIG. 11, quantization may have a relatively large impact to performance.

Model complexity analysis 900, on the left, shows compression performance vs compute. The BD-rate, in which a lower number is better, may be calculated based on the curves in rate/distortion plot 950. The kMACS/pixel and BOPs/px may be computed using a fullHD input. Unlike MACs, Binary OPerations (BOPs) take into account efficiency gains due to model quantization. The rate/distortion plot on the right shows the rate-distortion performance of the techniques of this disclosure and various baselines.

Rate-distortion plot 950 shows the rate-distortion performance of neural coder 600 and various baselines. Model complexity analysis 900 shows the BDrate versus the model complexity for various neural coders. In addition to FIG. 11, the BD-rate results are summarized in FIG. 15 hereinafter, for case of reading. In the examples of FIG. 11 et seq., neural coder 600 may be represented as QODEC, fp32 indicates floating point values of 32 bits, and int8 indicates fixed point values of 8 bits. When looking at floating-point neural coders, one can see that the best performing model is DCVC-DC, but it also has the largest model complexity. A floating-point version of neural coder 600 has the lowest model complexity (24.5 kMACs/pixel on the receiver-end) and matches the BD-rate of the SSF model which has an ~8× higher FLOP count. Compared to MobileCoder, which was also designed for on-device inference, neural coder 600 improve compression performance by 48%, while also reducing model complexity >10×. It may be noted, that at bitrates higher than 1.Mb/s, MobileCoder may outperform neural coder 600 in terms of compression performance. However, these bitrates are rarely used in practice.

Quantized neural coders can benefit from efficient integer hardware kernels. In terms of compression performance, none of these neural coder models can beat the floating-point neural baselines yet. However, these are the only end-to-end neural video coders that have been demonstrated to be able to decode in real time on a mobile device. Neural coder 600 outperformed MobileCoder int8, the only other work to show real time video decoding with a 40% BD-rate savings.

On HEVC-B, neural coder 600 achieved an inference speed of >30 FPS. Although the encoding pipeline of neural coder 600 was not optimized, neural coder 600 still achieved an effective encoding rate. As discussed above, FIG. 6 sets forth the approximate duration of each stage of the pipeline. The inference speed is bounded by the network processing and, due to parallelization, the warping operation and entropy coding are not causing any additional speed overhead. Neural coder 600 not only improves the compression performance compared with Mobile-Coder but also the throughput, as neural coder 600 processes full-HD (1080× 1920) video instead of (720×1280) video.

Integer model quantization is now discussed. Quantizing all weights and activations of a neural network may drastically improve its power efficiency. The techniques of this disclosure include quantizing neural coder 600 to 8-bits using integer quantization with a learned uniform grid defined by a bin width s and a zero-term parameter a. For network weights, neural coder 600 may learn a grid per output channel without using a zero term (e.g., symmetric per-channel quantization). For activations, neural coder 600 may learn a hardware-friendly single bin width grid including a zero term (e.g., asymmetric tensor quantization). Such quantization is unlike that of other neural coders which quantize learned image compression networks using per-channel activation quantization. Using per-channel activation quantization may require rescaling the accumulator for each input channel and thus may not benefit from optimized integer arithmetic kernels on hardware (unless the scales are a factor of two). In some examples, the biases of neural coder 600 are not quantized.

FIG. 12 is a table depicting example BD rate performance results for various quantizations for an example neural coder in accordance with one or more aspects of this disclosure. In the example of FIG. 12. x denotes values are not quantized, but remain in float32. ✓ indicates values are quantized to 8 bits with a learned grid.

An extensive model quantization experiment was conducted and it was discovered that the relatively popular mean-scale hyperprior model is very sensitive to the setup of quantizers in the latent bottleneck. For neural coder 600, the grids for some activation quantizers may be manually fixed and the grids of the remaining quantizers may be learned, as shown in FIG. 12 and learn the grids of the remaining quantizers. The effect of particular features of neural coder 600 on performance was evaluated by ablating various features and evaluating the neural coder with the various features ablated. The results are shown in FIG. 12.

Experiment results are now discussed. The two major axes on which neural coder 600 was evaluated are rate-distortion (R-D) performance and compute efficiency. The experimental results showed a reduction in compute complexity compared to previous neural on-device coders while improving compression performance with a BD-rate savings.

TABLE 1

BD-rate savings for different baselines on the HEVC-B dataset

| BD-rate relative to x.265 | PSNR YUV 611 | PSNR Y only |
|---|---|---|
| QODEC int8 | 141.6% | 107.7% |
| MobileCoder int8 (Le, 2022) | 340.2% | 288.4% |
| QODEC fp32 | 49.5% | 30.7% |
| MobileCoder fp32 (Le, 2022) | 191.0% | 141.6% |
| DCVC-DC (Li, 2023) | −58.5 | −57.62% |
| SSF-Pred (Pourreza, 2023) | −24.3% | 10.2% |
| SSF-YUV (Pourreza, 2023) | 54.4% | 10.1% |

Row I depicts the compression performance of an unquantized model. Row III depicts results for quantization of the activations with known grids to 8 bit integers. These activations include the pixel space inputs, the motion vectors, and the rounded symbols (latents shifted by the means). Such quantization incurs a 18.6% decrease in compression performance, mainly due to flow quantization, and provides an upper bound for quantization performance. Row IV depicts results for quantizing the weights using per-channel learned quantization grids in row, which further brings down compression performance to 27.1%. Row V depicts results for additionally quantizing all activations except for those in the latent and hyper-latent bottleneck, and compression performance drops to 135.9%.

In the model ablation, it is shown that overlapped block warp is the better choice for an efficient neural coder than other types of warping. In the quantization ablation, the problems that can arise when quantizing a mean-scale hyperprior compression model are shown, as well as how to circumvent such problems.

Figure 16:
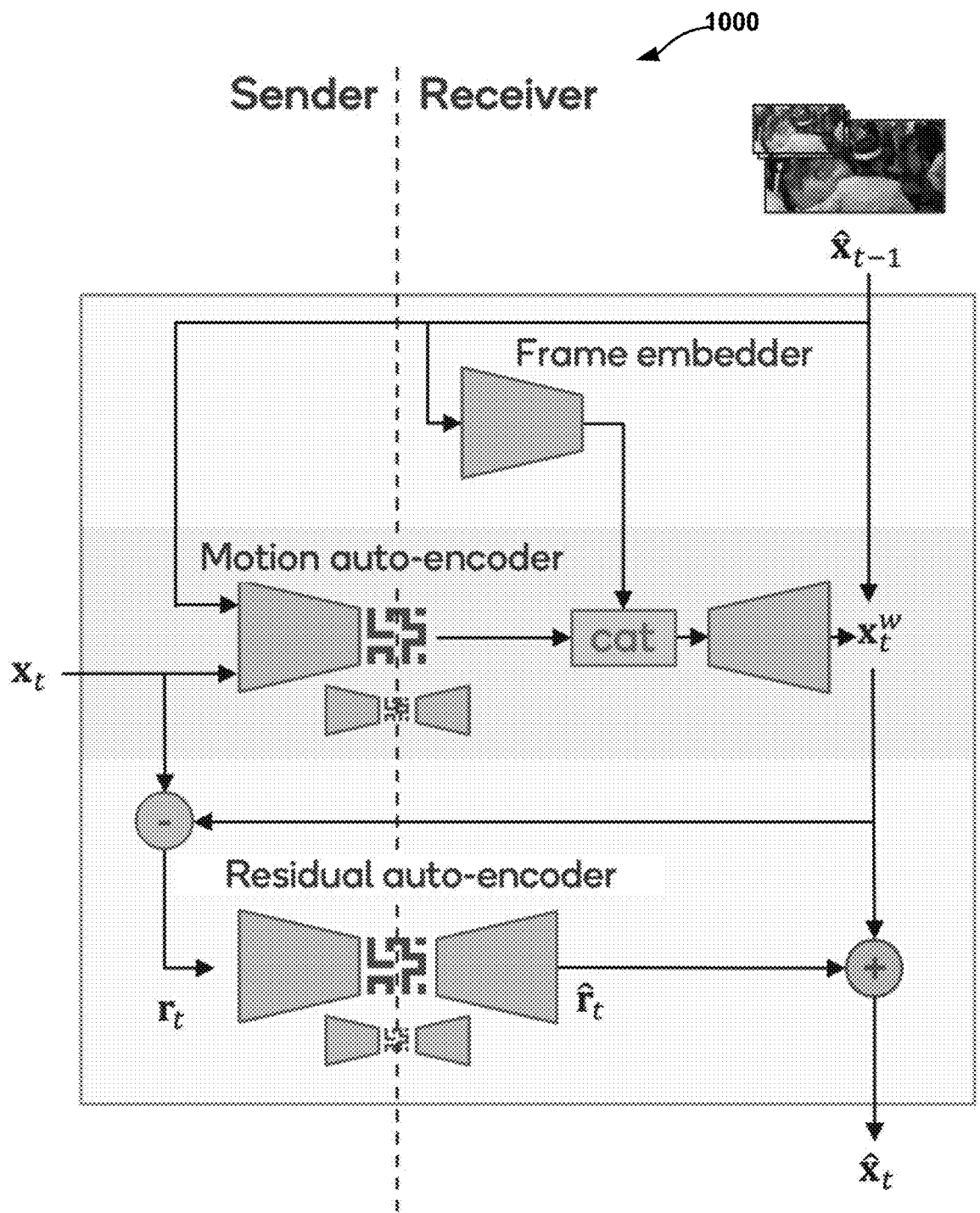
FIG. 16 is a conceptual diagram illustrating a model architecture of a flow-agnostic model according to the techniques of this disclosure.

With respect to warping, as expected, the model with dense warping (row III) has better RD performance than with an overlapped block-warp model (row I). However, the performance gap is relatively small (6% BD rate cost) and the dense warp model has more than 4× the model complexity as the overlapped block-warp model due to the higher flow dimensionality. When comparing the overlapped block-warp model with a vanilla block-based warping scheme (II) without block overlap, there is a drop of 19% in terms of compression performance. Alternatively, one could use a flow agnostic neural network model. For example, a model including a variant of that uses a conditional convolutional network that can model warping implicitly (details are shown in FIG. 16, hereinafter). The model of FIG. 16, shown in row IV, can be seen to be sub-optimal to the overlapped block-warp model both in terms of compute and compression performance.

A version of neural coder 600 with a scale-only prior instead of a mean-scale prior had compression performance is significantly reduced (9.6% increase in BD-rate) while efficiency gains are minimal (see row VI).

The effect of the second training stage is shown in row VII. Row VII shows the effect of training neural coder 600 (row I) for 250 more steps with the auxiliary losses described herein.

In the Post-Training Quantization (PTQ) phase, neural coder 600 may learn the quantizers by passing a small amount of data through the network and updating the quantizer bin width and zero term using a mean squared error (MSE) loss on the weight or activations which they quantize. For enhanced performance, neural coder 600 may follow the PTQ phase with a Quantization-Aware Training (QAT) phase where neural coder 600 updates both the network and quantizers parameters using a gradient decent.

FIG. 13 is a table depicting different example hyperparameters for different training stages in accordance with one or more aspects of this disclosure. Examples of hyperparameters of different training phases may be found in FIG. 13. In some examples, the AIMET toolkit may be used to quantize neural coder 600.

Loss functions are now discussed. The rate loss for neural coder 600 may be a sum of the bitrate for the latents and hyperlatents for each of the three auto-encoders discussed above of neural coder 600. Note that unlike other hyperprior models, the hyperprior model of this disclosure may include a mean-scale hyperprior for the entropy model over latents, and a normal distribution with learned variance and zero mean instead of a nonparametric distribution for the entropy model over hyperlatents for easier entropy-coding.

For example, neural coder 600 may reweigh the distortion losses for the Y:U:V channels with weights 6:1:1 so that the distortion losses align with the evaluation metrics as such:

$$D(x, \hat{x}) = \frac{6}{8}\|x^Y - \hat{x}^Y\|_2^2 + \frac{1}{8}\|x^U - \hat{x}^U\|_2^2 + \frac{1}{8}\|x^V - \hat{x}^V\|_2^2$$

One challenge for training small models at lower bitrates is that due to error accumulation, the frame quality may deteriorate over time. Neural coder 600 may circumvent this problem. First, neural coder 600 may halve the value of the rate-loss multiplier for I-frames s.t. such that the PSNR value for the chosen operating point of I-frames and P-frames becomes more similar to a previous coder. Secondly, neural coder 600 may use an exponentially modulated P-frame loss, where P-frames further away from the I-frame have a higher penalty, such as:

$$D_{mod}(x, \hat{x}, \tau) = \frac{T}{\sum_{i=0}^{T-1} \tau^i} \sum_{i=0}^{T-1} \tau^i D(x_i, \hat{x}_i)$$

Additionally, neural coder 600 may use auxiliary losses during the first phase of training to enforce the network to learn meaningful extrapolated and reconstructed flow vectors ($f^p$, $\hat{f}$) respectively. These losses may include of the YUV 611 mean squared error between the original frame and the previous reconstruction warped with the motion field: $D_{flow}(f, \hat{x}_{t-1}, x_t) = D(\text{warp}(x_{t-1}, f), x_t)$.

Neural coder 600 may use rounding of latents and hyper-latents at evaluation time. During training, neural coder 600 may use additive noise to estimate the rate loss, and rounding of the latents and hyperlatents pathways that feed into the decoder (e.g., video decoder 300).

Neural coder 600's final loss may include a weighted combination of all loss terms:

$$L(x) = \beta R(x_1) + D(x_1, \hat{x}_1) + 2\beta R(x_{>1}) + D_{mod}(x_{>1}, \hat{x}_{>1}, \tau) + \lambda D_{flow}(f^P) + \lambda D_{flow}(\hat{f}).$$

Neural coder 600 may include a newly trained model for each value of $\beta$, and use different values of $\lambda$ and $\tau$ for different training stages (see FIG. 12).

Experiments were conducted with regard to neural coder 600. Training of neural coder 600 may be divided into four stages: the first two stages include training the floating point model end-to-end on a rate-distortion loss and differ only in their hyperparameters. The third stage, may include post-training quantization (PTQ) where the quantizers are fit while keeping the model parameters fixed. The last quantization aware training (QAT) stage may include fine tuning both the model- and quantization-parameters of the quantized model using a straight through estimator. The hyper-parameters for various training stages can be found in FIG. 13.

To evaluate compression performance, peak signal-to-noise ratio (PSNR) on the Y, U and V channels was separately computed. In line with common evaluation protocols, the PSNR was averaged over the Y:U:V channels with weights of 6:1:1. Bjøntegaard-Delta bitrate (BD-rate) was utilized to summarize rate-distortion performance in a single metric. To compute this metric, bits-per-pixel (bpp) and YUV 6:1:1 PSNR metrics were used. After interpolating each curve, all points with a bitrate below 0.25 bpp were selected and points outside the distortion range defined by the intersection of the support for all RD-curves were discarded for a fair comparison.

FIG. 14 is a table depicting example model complexities for a variety of neural coders in accordance with one or more aspects of this disclosure. The FLOP count was determined using DeepSpeed. Since different packages such as PTflops are known to produce different FLOP counts, the FLOP counts relating to previous coders were recomputed with the same package to the extent possible. Details can be found in FIG. 14. For hardware-based results, the encoder (e.g., video encoder 200) and decoder (e.g., video decoder 300) algorithms were run on a device (e.g., computing device 402). The size of the entropy-encoded bitstream was measured to calculate the rate and compute the PSNR based on the decoded video. AIMET simulated rate-distortion results are comparable with the numbers reported for another neural coder.

FIG. 14 highlights the model complexity of neural coder 600 and other coders divided into subnetworks. Because neural coder 600 was optimized for receiver inference speed, the receiver of neural coder 600 has 25% of the kMACs of the sender of neural coder 600, whereas for other models this is 70-80%. Additionally, it can be seen that all components dealing with motion are very low complexity for neural coder 600 compared with other coders due to the low-dimensional flow vectors of neural coder 600. Lastly, the motion-autoencoder of neural coder 600 is also more efficient on the receiver side due to the fact that only the Y-channels are used. It may be noted that the warping operation itself is not taken into account in the MAC count, but as shown and described above with respect to FIG. 6, the warping may be executed in parallel with the neural networks and is therefore not leading to extra inference time.

Neural coder 600 was compared against neural video compression techniques that report YUV performance but do not report performance on full video sequences. In such cases, when possible, those techniques were reevaluated. The one neural coded for which mobile device implementation results were reported was trained for RGB. Since this model was originally trained for RGB, the model was modified by fine tuning the model on the YUV 6:1:1 R-D loss. H.265 and H.264 implementation were tested. In order to make a fair comparison, B-frames were not used.

Neural coder 600 was trained on Vimeo90k and the Xiph5N dataset was used for validation and early stopping. Neural coder 600 was evaluated on many standard video compression benchmarks including the HEVC-B test sequences, on the UVG-1k sequences, and finally the MCL-JVC sequences.

FIG. 15 is a table depicting BD rate performance results for various example neural coders in accordance with one or more aspects of this disclosure. As mentioned above, neural coder 600 may be represented as QODEC int8, for a quantized version of neural coder 600, and QODEC fp32, for a floating point version of neural coder 600.

FIG. 16 is a conceptual diagram illustrating a model architecture of a flow-agnostic model according to the techniques of this disclosure. Architecture 1000 of FIG. 16 is mentioned above with respect to FIG. 12 and represents a flow agnostic neural coder that performs implicit warping.

Figure 17:
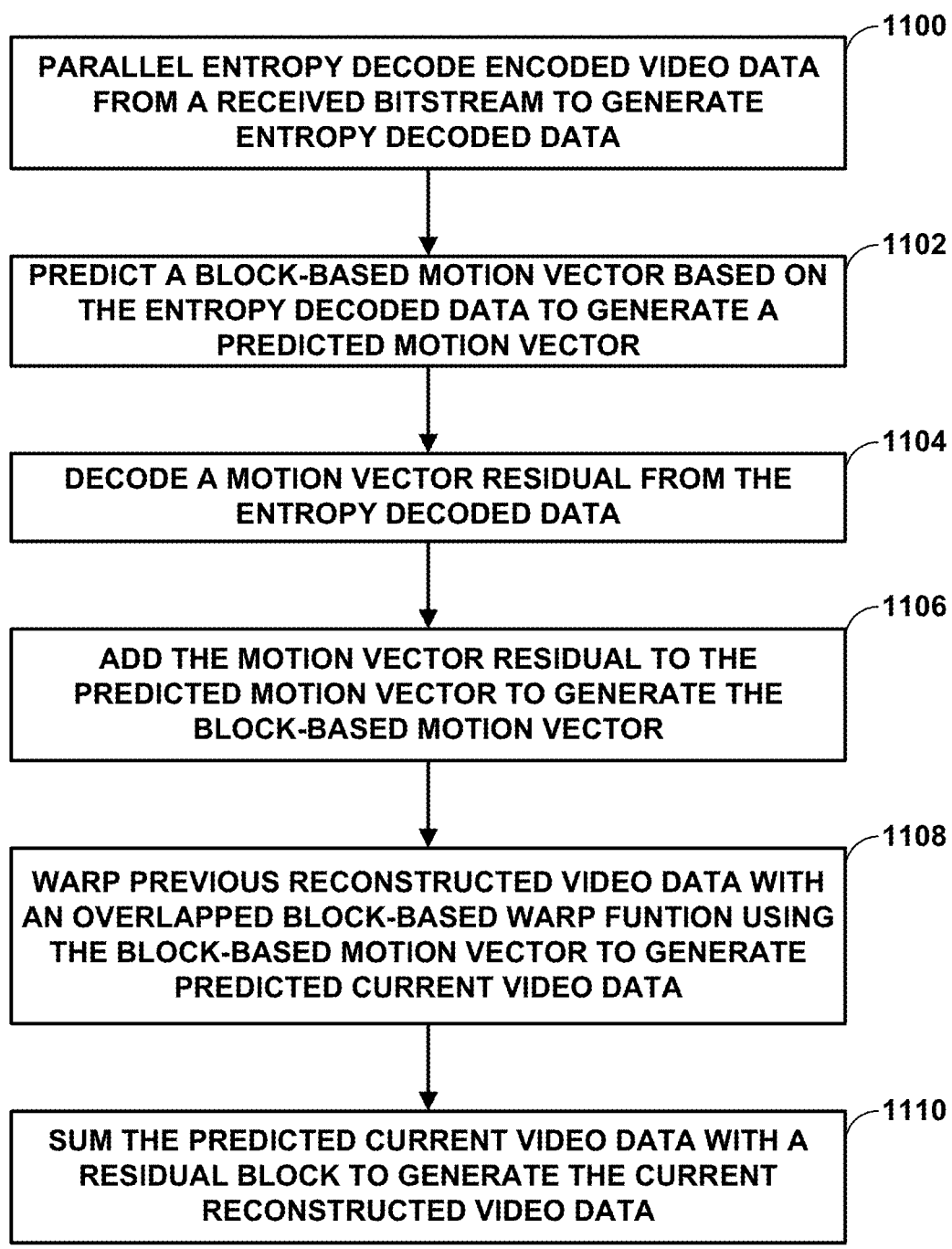
FIG. 17 is a flow diagram illustrating example decoding techniques according to one or more aspects of this disclosure.

FIG. 17 is a flow diagram illustrating example decoding techniques according to one or more aspects of this disclosure. The techniques of FIG. 17 are described with respect to FIGS. 2-4 above, but may be practiced by any device(s) capable of doing so. One or more processors 440 may parallel entropy decode encoded video data from a received bitstream to generate entropy decoded data (1100). For example, GPU(s) 412 of one or more processors 440 and/or entropy decoder 506 may parallel entropy decode encoded video data from a received bitstream to generate entropy decoded data.

One or more processors 440 may predict a block-based motion vector based on the entropy decoded data to generate a predicted motion vector (1102). For example, one or more processors 440 may predict the block-based motion vector $\hat{f}_t$ based on the entropy decoded data to generate the predicted motion vector $f_t^P$. The predicted motion vector $f_t^P$ may be a block-based predicted motion vector. One or more processors 440 may decode a motion vector residual from the entropy decoded data (1104). For example, one or more processors 440 may execute neural network model 422 to decode the motion vector residual $\delta f_t$ from the entropy decoded data. One or more processors 440 may add the motion vector residual to the predicted motion vector to generate the block-based motion vector (1106). For example, one or more processors 440 may use additive flow prediction (add 630) to add the motion vector residual $\delta f_t$ to the predicted motion vector $f_t^P$ to generate the block-based motion vector $\hat{f}_t$. One or more processors 440 may warp previous reconstructed video data with an overlapped block-based warp function using the block-based motion vector to generate predicted current video data (1108). For example, one or more processors 440 may apply an overlapped block-based warp function (e.g., warp 612 of FIG. 4) to previous reconstructed video data $\hat{x}_{t-1}$ using the block-based motion vector $\hat{f}_t$.

One or more processors 440 may sum the predicted current video data with a residual block to generate the current reconstructed video data (1110). For example, one or more processors 440 may sum the predicted current video data $x_t^w$ with a residual block $\hat{r}_t$ to generate the current reconstructed video data $\hat{x}_t$.

In some examples, as part of decoding the motion vector residual, one or more processors 440 are configured to decode a pixel-based motion vector residual using neural network model 422. In some examples, neural network model 422 is quantization-aware trained.

In some examples, the overlapped block-based warp function (e.g., warp 612) is configured to warp a block of the previous reconstructed video data a plurality of times using a respective motion vector of a respective surrounding block to generate warping results and average the warping results using a decay. In some examples, as part of parallel entropy decoding the encoded video data, one or more processors 440 are configured to parallel entropy decode the encoded video data with at least one graphics processing unit 412. In some examples, as part of warping the previous reconstructed video data, one or more processors 440 are configured to block-based frame interpolation (FINT) warp the previous reconstructed video data. In some examples, as part of block-based FINT warping the previous reconstructed video data, the one or more processors are configured to use FINT kernel 432 to FINT warp the previous reconstructed video data. In some examples, FINT kernel 432 is implemented in neural network signal processor 430.

In some examples, the encoded video data represents YUV420 video data and the current reconstructed video comprises YUV420 video data. In some examples, one or more processors 440 are configured to quantize at least a portion of the entropy decoded data. In some examples, as part of quantizing the at least a portion of the entropy decoded data, one or more processors 440 are configured to quantize at least one of a latent, a mean, or a scale. In some examples, as part of quantizing the at least a portion of the entropy decoded data, one or more processors 440 are configured to quantize the at least a portion of the entropy decoded data using int8.

In some examples, one or more processors 440 are further configured to apply flow extrapolator 610 to the entropy decoded data to generate extrapolated flow. In some examples, one or more processors 440 are further configured to preform additive flow prediction 630 using the extrapolated flow. In some examples, the encoded video data includes luma data.

FIG. 18 is a table depicting inference speed and rate overhead for different parallelization techniques in accordance with one or more aspects of this disclosure. In some examples, one or more processors 440 may use one of the settings set forth in FIG. 18, such as 512 threads on GPU(s) 412.

Figure 19:
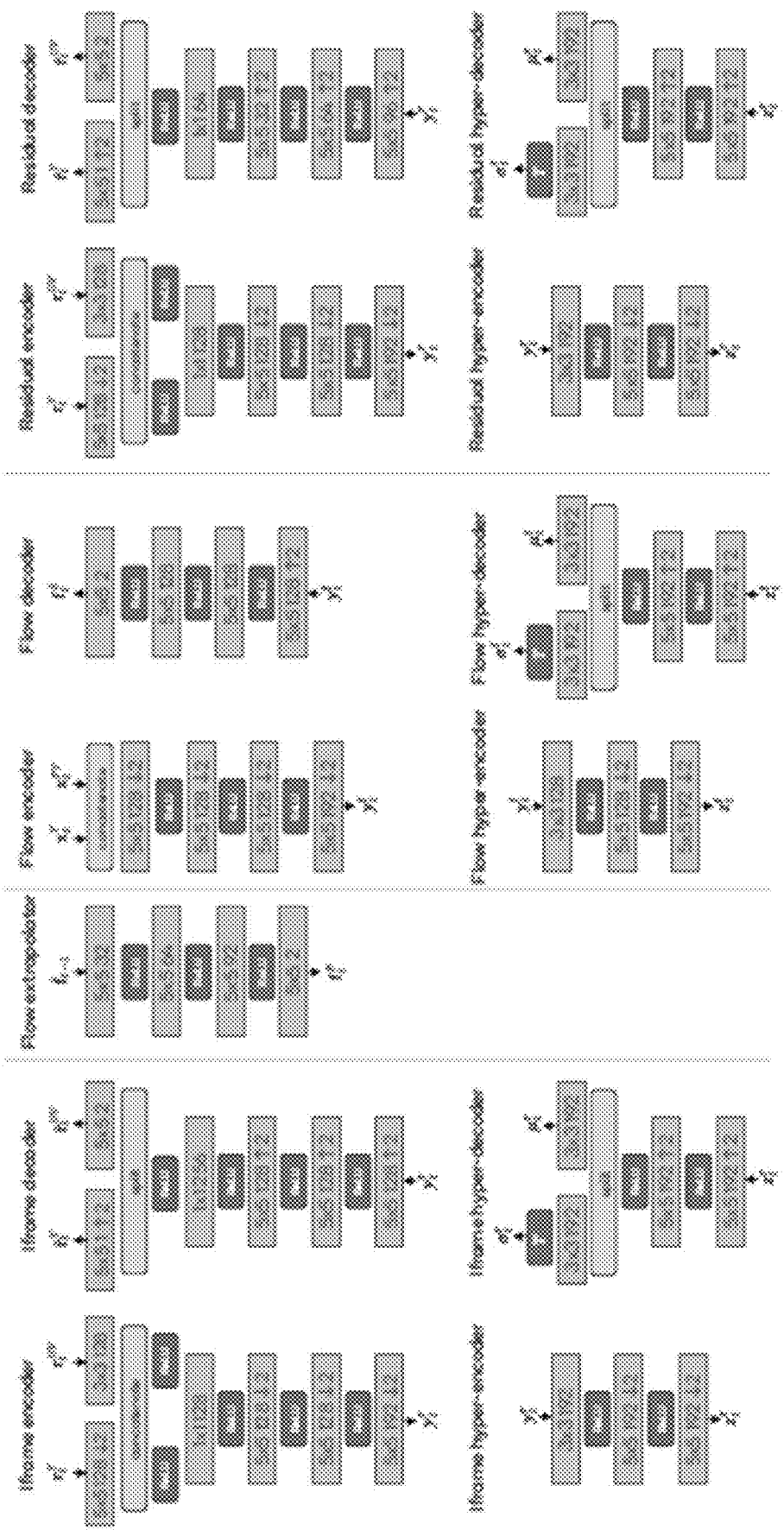
FIG. 19 is a conceptual diagram illustrating an example model architecture for neural networks of a P-frame model in accordance with one or more aspects of this disclosure.

FIG. 19 is a conceptual diagram illustrating an example model architecture for neural networks of a P-frame model in accordance with one or more aspects of this disclosure. The example of FIG. 19 may represent a model architecture of neural network model 422. Convolutional layers are displayed as k×k c, where k refers to kernel size and c refers to the number of output channels. Convolutions with stride s are indicated by ↓s and transposed convolutions with stride s are shown as ↑s.

Figure 20:
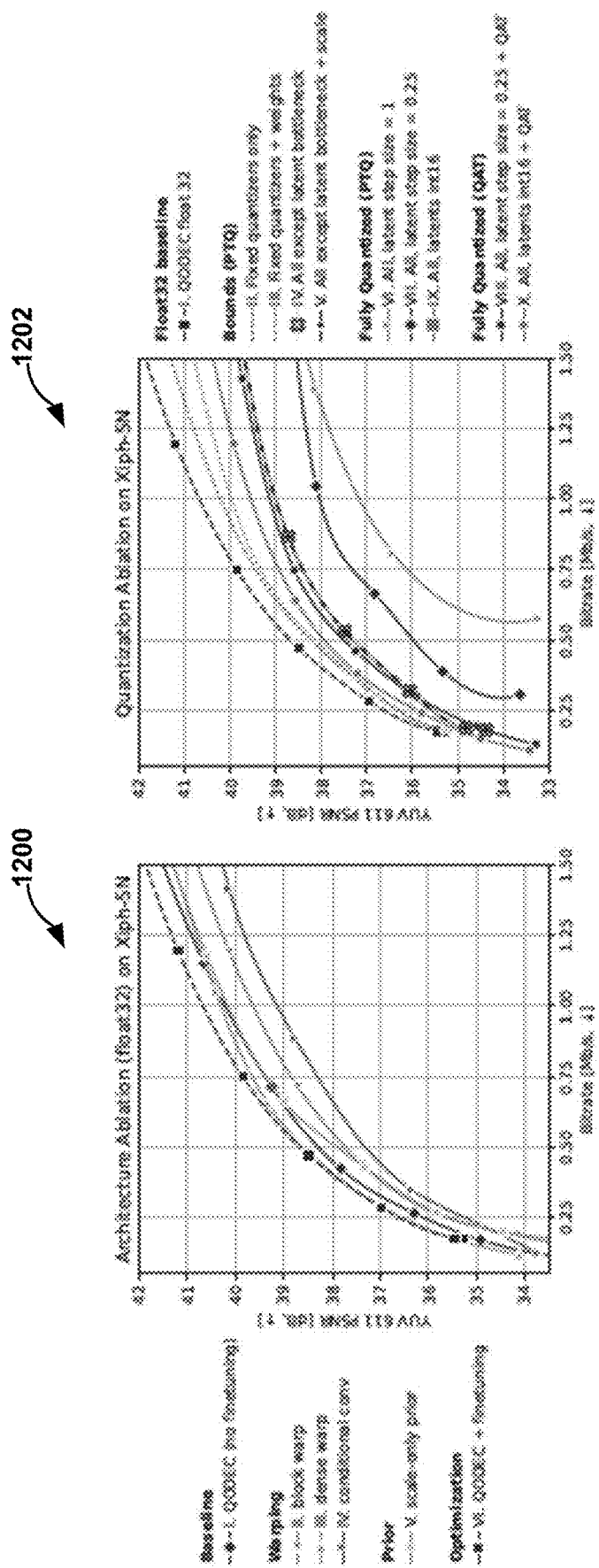
FIG. 20 is a graphical diagram illustrating test results for model ablation and quantization ablation in accordance with one or more aspects of this disclosure.

FIG. 20 is a graphical diagram illustrating test results for model ablation and quantization ablation in accordance with one or more aspects of this disclosure. Model ablation graph 1200 is described in more detail in the table of FIG. 8. Quantization ablation graph 1202 is described in more detail in the table of FIG. 12.

Figure 21:
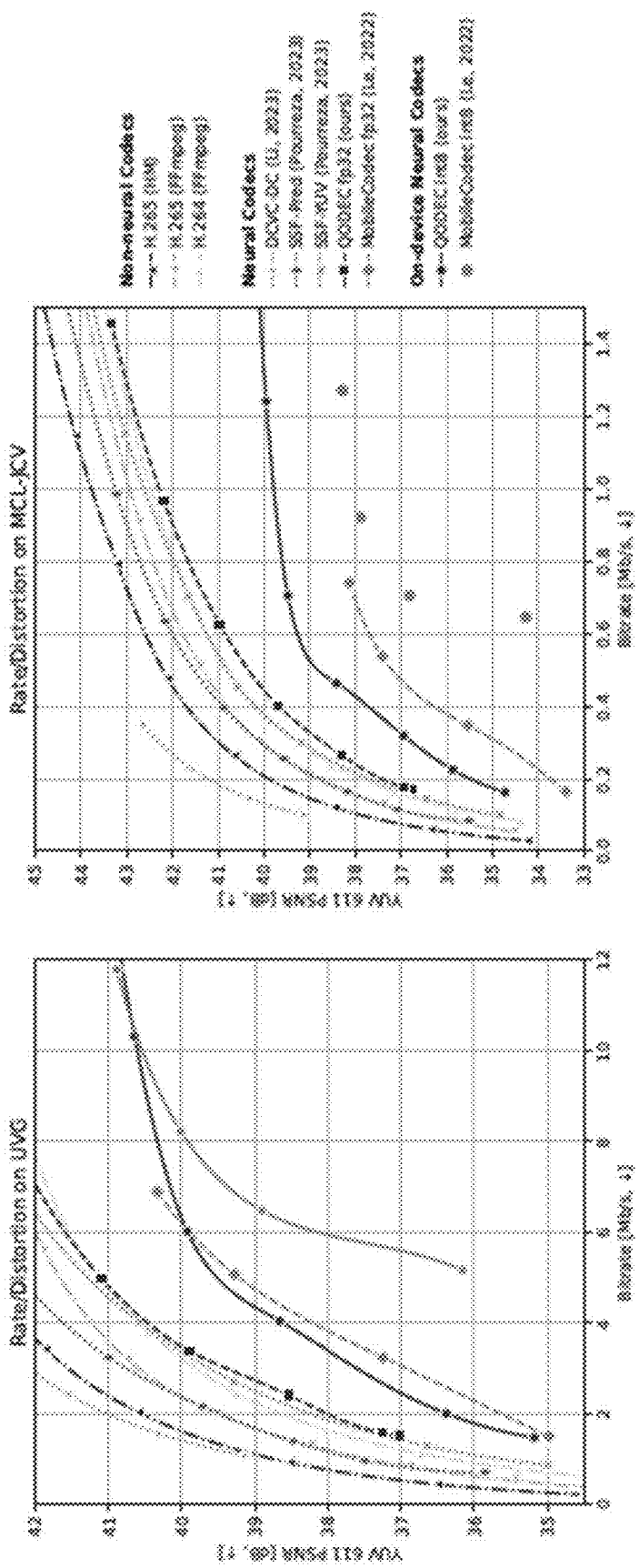
FIG. 21 is a graphical diagram illustrating rate-distortion performance for different neural video coders on UVG and MCL.

FIG. 21 is a graphical diagram illustrating rate-distortion performance for different neural video coders on UVG and MCL.

Aspects of the techniques of this disclosure include the following clauses.

Clause 1A. A method of decoding video data, the method comprising: entropy decoding encoded video data from a received bitstream to generate entropy decoded data; decoding, using a neural network model, the entropy decoded data to generate a motion vector and a residual; warping the motion vector with a warp function to generate a warped motion vector; and summing the warped motion vector with the residual to generate reconstructed video data.

Clause 2A. The method of clause 1A, wherein the motion vector comprises a motion vector for a block of the video data.

Clause 3A. The method of clause 1A or clause 2A, wherein entropy decoding the encoded video data comprises parallel entropy decoding the encoded video data.

Clause 4A. The method of clause 3A, wherein parallel entropy decoding the encoded video data comprises parallel entropy decoding the encoded video data with a graphics processing unit.

Clause 5A. The method of any of clauses 2A-4A, wherein warping the motion vector comprises block-based frame interpolation (FINT) warping the motion vector.

Clause 6A. The method of clause 5A, wherein block-based FINT warping the motion vector comprises using a FINT kernel to FINT warp the motion vector.

Clause 7A. The method of clause 6A, wherein the FINT kernel is implemented in a neural network signal processor.

Clause 8A. The method of any of clauses 1A-7A, wherein the encoded video data represents YUV420 video data and the reconstructed video comprises YUV420 video data.

Clause 9A. The method of any of clauses 1A-8A, wherein decoding, using the neural network, the entropy decoded data comprises quantizing the entropy decoded data.

Clause 10A. The method of clause 9A, wherein quantizing the entropy decoded data comprises quantizing at least one of a latent, a mean, or a scale.

Clause 11A. The method of clause 9A or clause 10A, wherein the quantizing the entropy decoded data comprises quantizing at least a portion of the entropy decoded data using int8.

Clause 12A. The method of any of clauses 9A-11A, wherein the neural network model is quantization-aware trained.

Clause 13A. The method of any of clauses 1A-12A, further comprising applying a flow extrapolator to the entropy decoded data to generate extrapolated flow.

Clause 14A. The method of clauses 13A, further comprising preforming additive flow prediction using the extrapolated flow.

Clause 15A. The method of any of clauses 1A-14A, wherein the video data comprises luma data.

Clause 16A. A method of decoding video data, the method comprising: decoding hyperlatents; extrapolating a first flow; decoding means and scales from the hyperlatents; decoding latents based on the scales; reconstructing a second flow and a residual based on the latents and the first flow;

warping a previous reconstructed frame using the second flow to generate a warped frame; and adding the residual to the warped frame.

Clause 17A. A method of encoding the video data that is decoded using the method of any of clauses 1A-16A.

Clause 18A. A device for coding video data, the device comprising: a memory for storing the video data; and one or more processors configured to perform the method of any of clauses 1A-17A.

Clause 19A. A computer-readable storage medium storing instructions that, when executed, cause one or more processors to perform the method of any of clauses 1A-17A.

Clause 20A. A device for coding video data, the device comprising one or more means for performing the method of any of clauses 1A-17A.

Clause 1B. A device for coding video data, the device comprising: memory for storing the video data, the video data comprising previous reconstructed video data and current reconstructed video data; and one or more processors configured to: parallel entropy decode encoded video data from a received bitstream to generate entropy decoded data; predict a block-based motion vector based on the entropy decoded data to generate a predicted motion vector; decode a motion vector residual from the entropy decoded data; add the motion vector residual and block-based motion vector to generate the block-based motion vector; warp the previous reconstructed video data with an overlapped block-based warp function using the block-based motion vector to generate predicted current video data; and sum the predicted current video data with a residual block to generate the current reconstructed video data.

Clause 2B. The device of clause 1B, wherein as part of decoding the motion vector residual, the one or more processors are configured to decode a pixel-based motion vector residual using a neural network model.

Clause 3B. The device of clause 2B, wherein the neural network model is quantization-aware trained.

Clause 4B. The device of any of clauses 1B-3B, wherein the overlapped block-based warp function is configured to: warp a block of the previous reconstructed video data a plurality of times using a respective motion vector of a respective surrounding block to generate warping results; and average the warping results using a decay.

Clause 5B. The device of any of clauses 1B-4B, wherein as part of parallel entropy decoding the encoded video data, the one or more processors are configured to parallel entropy decode the encoded video data with at least one graphics processing unit.

Clause 6B. The device of any of clauses 1B-5B, wherein as part of warping the previous reconstructed video data, the one or more processors are configured to block-based frame interpolation (FINT) warp the previous reconstructed video data.

Clause 7B. The device of clause 6B, wherein as part of block-based FINT warping the previous reconstructed video data, the one or more processors are configured to use a FINT kernel to FINT warp the previous reconstructed video data.

Clause 8B. The device of clause 7B, wherein the FINT kernel is implemented in a neural network signal processor.

Clause 9B. The device of any of clauses 1B-8B, wherein the encoded video data represents YUV420 video data and the current reconstructed video data comprises YUV420 video data.

Clause 10B. The device of any of clauses 1B-9B, wherein the one or more processors are further configured to quantize at least a portion of the entropy decoded data.

Clause 11B. The device of clause 10B, wherein as part of quantizing the at least a portion of the entropy decoded data, the one or more processors are configured to quantize at least one of a latent, a mean, or a scale.

Clause 12B. The device of clause 10B or clause 11B, wherein as part of quantizing the at least a portion of the entropy decoded data, the one or more processors are configured to quantize the at least a portion of the entropy decoded data using int8.

Clause 13B. The device of any of clauses 1B-12B, wherein the one or more processors are further configured to apply a flow extrapolator to the entropy decoded data to generate extrapolated flow.

Clause 14B. The device of clause 13B, wherein the one or more processors are further configured to preform additive flow prediction using the extrapolated flow.

Clause 15B. The device of any of clauses 1B-14B, wherein the encoded video data comprises luma data.

Clause 16B. A method of decoding video data, the method comprising: parallel entropy decoding encoded video data from a received bitstream to generate entropy decoded data; predicting a block-based motion vector based on the entropy decoded data to generate a predicted motion vector; decoding a motion vector residual from the entropy decoded data; adding the motion vector residual and the predicted motion vector to generate the block-based motion vector; warping previous reconstructed video data with an overlapped block-based warp function using the block-based motion vector to generate predicted current video data; and summing the predicted current video data with a residual block to generate current reconstructed video data.

Clause 17B. The method of clause 16B, wherein decoding the motion vector residual comprises decoding a pixel-based motion vector residual using a neural network model.

Clause 18B. The method of clause 17B, wherein the neural network model is quantization-aware trained.

Clause 19B. The method of any of clauses 16B-18B, wherein warping the previous reconstructed video data with the overlapped block-based warp function comprises: warping a block of the previous reconstructed video data a plurality of times using a respective motion vector of a respective surrounding block to generate warping results; and averaging the warping results using a decay.

Clause 20B. The method of any of clauses 16B-19B, wherein parallel entropy decoding the encoded video data comprises parallel entropy decoding the encoded video data with at least one graphics processing unit.

Clause 21B. The method of any of clauses 16B-20B, wherein warping the previous reconstructed video data comprises block-based frame interpolation (FINT) warping the previous reconstructed video data.

Clause 22B. The method of clause 21B, wherein block-based FINT warping the previous reconstructed video data comprises using a FINT kernel to FINT warp the previous reconstructed video data.

Clause 23B. The method of clause 22B, wherein the FINT kernel is implemented in a neural network signal processor.

Clause 24B. The method of any of clauses 16B-23B, wherein the encoded video data represents YUV420 video data and the reconstructed video comprises YUV420 video data.

Clause 25B. The method of any of clauses 16B-24B, further comprising quantizing at least a portion of the entropy decoded data.

Clause 26B. The method of clause 25B, wherein quantizing the at least a portion of the entropy decoded data comprises quantizing at least one of a latent, a mean, or a scale.

Clause 27B. The method of clause 25B or clause 26B, wherein the quantizing the at least a portion of the entropy decoded data comprises quantizing the at least a portion of the entropy decoded data using int8.

Clause 28B. The method of any of clauses 16B-27B, further comprising applying a flow extrapolator to the entropy decoded data to generate extrapolated flow.

Clause 29B. The method of clause 28B, further comprising preforming additive flow prediction using the extrapolated flow.

Clause 30B. The method of any of clauses 16B-29B, wherein the encoded video data comprises luma data.

Clause 31B. A device for coding video data, the device comprising: means for parallel entropy decoding encoded video data from a received bitstream to generate entropy decoded data; means for predicting a block-based motion vector based on the entropy decoded data to generate a predicted motion vector; means for decoding a motion vector residual from the entropy decoded data; means for adding the motion vector residual and the predicted motion vector to generate the block-based motion vector; means for warping previous reconstructed video data with an overlapped block-based warp function using the block-based motion vector to generate predicted current video data; and means for summing the predicted current video data with a residual block to generate current reconstructed video data.

Clause 32B. A non-transitory, computer-readable storage medium storing instructions that, when executed, cause one or more processors to: parallel entropy decode encoded video data from a received bitstream to generate entropy decoded data; predict a block-based motion vector based on the entropy decoded data to generate a predicted motion vector; decode a motion vector residual from the entropy decoded data; add the motion vector residual to the predicted motion vector to generate the block-based motion vector; warp previous reconstructed video data with an overlapped block-based warp function using the block-based motion vector to generate predicted current video data; and sum the predicted current video data with a residual block to generate current reconstructed video data.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined coder. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a coder hardware unit or provided by a collection of interoperative hardware units, including one or more processors as described above, in conjunction with suitable software and/or firmware.

This disclosure also includes attached appendices, which forms part of this disclosure and is expressly incorporated herein. The techniques disclosed in the appendices may be performed in combination with or separately from the techniques disclosed herein.

Various examples have been described. These and other examples are within the scope of the following claims.

What is claimed is:

1. A device for coding video data, the device comprising:
memory for storing the video data, the video data comprising previous reconstructed video data and current reconstructed video data; and
one or more processors configured to:
parallel entropy decode encoded video data from a received bitstream to generate entropy decoded data;
predict a block-based motion vector based on a flow extrapolator applied to the entropy decoded data to generate a predicted motion vector;
decode a motion vector residual, with a decoder of a flow auto-encoder, from the entropy decoded data;
add the motion vector residual to the predicted motion vector to generate the block-based motion vector;
warp the previous reconstructed video data with an overlapped block-based warp function using the block-based motion vector to generate predicted current video data; and
sum the predicted current video data with a residual block, wherein the residual block is output from a decoder of a residual auto-encoder, to generate the current reconstructed video data.

2. The device of claim 1, wherein the motion vector residual, is a pixel-based motion vector residual.

3. The device of claim 2, wherein the flow auto-encoder is quantization-aware trained.

4. The device of claim 1, wherein the overlapped block-based warp function is configured to:
- warp a block of the previous reconstructed video data a plurality of times using a respective motion vector of a respective surrounding block to generate warping results; and
- average the warping results using a decay.

5. The device of claim 1, wherein as part of parallel entropy decoding the encoded video data, the one or more processors are configured to parallel entropy decode the encoded video data with at least one graphics processing unit.

6. The device of claim 1, wherein as part of warping the previous reconstructed video data, the one or more processors are configured to block-based frame interpolation (FINT) warp the previous reconstructed video data.

7. The device of claim 6, wherein as part of block-based FINT warping the previous reconstructed video data, the one or more processors are configured to use a FINT kernel to FINT warp the previous reconstructed video data.

8. The device of claim 7, wherein the FINT kernel is implemented in a neural network signal processor.

9. The device of claim 1, wherein the encoded video data represents YUV420 video data and the current reconstructed video data comprises YUV420 video data.

10. The device of claim 1, wherein the one or more processors are further configured to quantize at least a portion of the entropy decoded data.

11. The device of claim 10, wherein as part of quantizing the at least a portion of the entropy decoded data, the one or more processors are configured to quantize at least one of a latent, a mean, or a scale.

12. The device of claim 10, wherein as part of quantizing the at least a portion of the entropy decoded data, the one or more processors are configured to quantize the at least a portion of the entropy decoded data using int8.

13. The device of claim 1, wherein the one or more processors are configured to apply the flow extrapolator to the entropy decoded data to generate extrapolated flow.

14. The device of claim 13, wherein the one or more processors are configured to preform additive flow prediction using the extrapolated flow.

15. The device of claim 1, wherein the encoded video data comprises luma data.

16. A method of decoding video data, the method comprising:
- parallel entropy decoding encoded video data from a received bitstream to generate entropy decoded data;
- predicting a block-based motion vector based on a flow extrapolator applied to the entropy decoded data to generate a predicted motion vector;
- decoding a motion vector residual, with a decoder of a flow auto-encoder, from the entropy decoded data;
- adding the motion vector residual and the predicted motion vector to generate the block-based motion vector;
- warping previous reconstructed video data with an overlapped block-based warp function using the block-based motion vector to generate predicted current video data; and
- summing the predicted current video data with a residual block, wherein the residual block is output from a decoder of a residual auto-encoder, to generate current reconstructed video data.

17. The method of claim 16, wherein decoding the motion vector residual comprises decoding a pixel-based motion vector residual using a neural network model.

18. The method of claim 17, wherein the neural network model is quantization-aware trained.

19. The method of claim 16, wherein warping the previous reconstructed video data with the overlapped block-based warp function comprises:
- warping a block of the previous reconstructed video data a plurality of times using a respective motion vector of a respective surrounding block to generate warping results; and
- averaging the warping results using a decay.

20. The method of claim 16, wherein parallel entropy decoding the encoded video data comprises parallel entropy decoding the encoded video data with at least one graphics processing unit.

21. The method of claim 16, wherein warping the previous reconstructed video data comprises block-based frame interpolation (FINT) warping the previous reconstructed video data.

22. The method of claim 21, wherein block-based FINT warping the previous reconstructed video data comprises using a FINT kernel to FINT warp the previous reconstructed video data.

23. The method of claim 22, wherein the FINT kernel is implemented in a neural network signal processor.

24. The method of claim 16, wherein the encoded video data represents YUV420 video data and the current reconstructed video comprises YUV420 video data.

25. The method of claim 16, further comprising quantizing at least a portion of the entropy decoded data.

26. The method of claim 25, wherein quantizing the at least a portion of the entropy decoded data comprises quantizing at least one of a latent, a mean, or a scale.

27. The method of claim 25, wherein the quantizing the at least a portion of the entropy decoded data comprises quantizing the at least a portion of the entropy decoded data using int8.

28. The method of claim 16, further comprising applying the flow extrapolator to the entropy decoded data to generate extrapolated flow.

29. The method of claim 28, further comprising preforming additive flow prediction using the extrapolated flow.

30. The method of claim 16, wherein the encoded video data comprises luma data.

31. A device for coding video data, the device comprising:
- means for parallel entropy decoding encoded video data from a received bitstream to generate entropy decoded data;
- means for predicting a block-based motion vector based on a flow extrapolator applied to the entropy decoded data to generate a predicted motion vector;
- means for decoding a motion vector residual, with a decoder of a flow auto-encoder, from the entropy decoded data;
- means for adding the motion vector residual and the predicted motion vector to generate the block-based motion vector;
- means for warping previous reconstructed video data with an overlapped block-based warp function using the block-based motion vector to generate predicted current video data; and means for summing the predicted current video data with a residual block, wherein the residual block is output from a decoder of a residual auto-encoder, to generate current reconstructed video data.

32. A non-transitory, computer-readable storage medium storing instructions that, when executed, cause one or more processors to:
  parallel entropy decode encoded video data from a received bitstream to generate entropy decoded data;
  predict a block-based motion vector based on a flow extrapolator applied to the entropy decoded data to generate a predicted motion vector;
  decode a motion vector residual, with a decoder of a flow auto-encoder, from the entropy decoded data;
  add the motion vector residual to the predicted motion vector to generate the block-based motion vector;
  warp previous reconstructed video data with an overlapped block-based warp function using the block-based motion vector to generate predicted current video data; and
sum the predicted current video data with a residual block, wherein the residual block is output from a decoder of a residual auto-encoder, to generate current reconstructed video data.

* * * * *